United States Patent [19]

Raab

[11] Patent Number: 5,794,356
[45] Date of Patent: *Aug. 18, 1998

[54] THREE DIMENSIONAL COORDINATE MEASURING APPARATUS

[75] Inventor: Simon Raab, Longwood, Fla.

[73] Assignee: Faro Technologies, Inc., Lake Mary, Fla.

[*] Notice: The term of this patent shall not extend beyond the expiration date of Pat. No. 5,611,147.

[21] Appl. No.: 751,904

[22] Filed: Nov. 18, 1996

Related U.S. Application Data

[63] Continuation of Ser. No. 398,592, Mar. 3, 1995, Pat. No. 5,611,147.

[51] Int. Cl.[6] .................................................. G01B 7/03
[52] U.S. Cl. .......................... 33/503; 33/504; 33/1 PT
[58] Field of Search .............................. 33/503, 502, 504, 33/1 M, 1 V, 1 N, 1 PT; 364/413.13

[56] References Cited

U.S. PATENT DOCUMENTS 5,611,147  3/1997  Raab ............................................. 33/503

*Primary Examiner*—Christopher W. Fulton
*Attorney, Agent, or Firm*—Fishman, Dionne, Cantor & Colburn

[57] ABSTRACT

A novel, portable coordinate measuring machine comprises a multijointed (preferably six and/or seven joints) manually positionable measuring arm for accurately and easily measuring a volume, which in a preferred embodiment, comprises a sphere ranging from six to eight feet in diameter and a measuring accuracy of 2 Sigma ±0.003 inch. In addition to the measuring arm, the present invention employs a controller (or serial box) which acts as the electronic interface between the arm and a host computer. Additionally, a number of end effector probes are provided that fulfill functions other than measurement only.

57 Claims, 26 Drawing Sheets

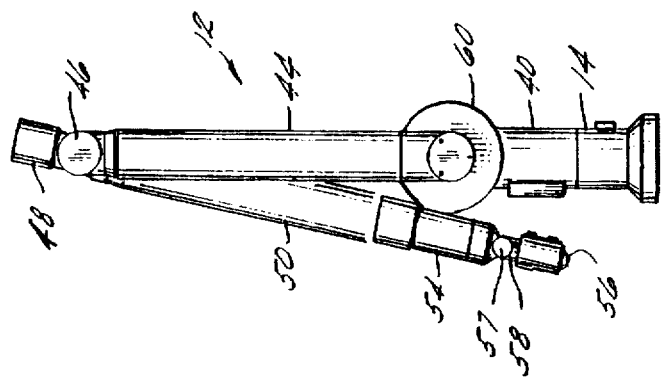
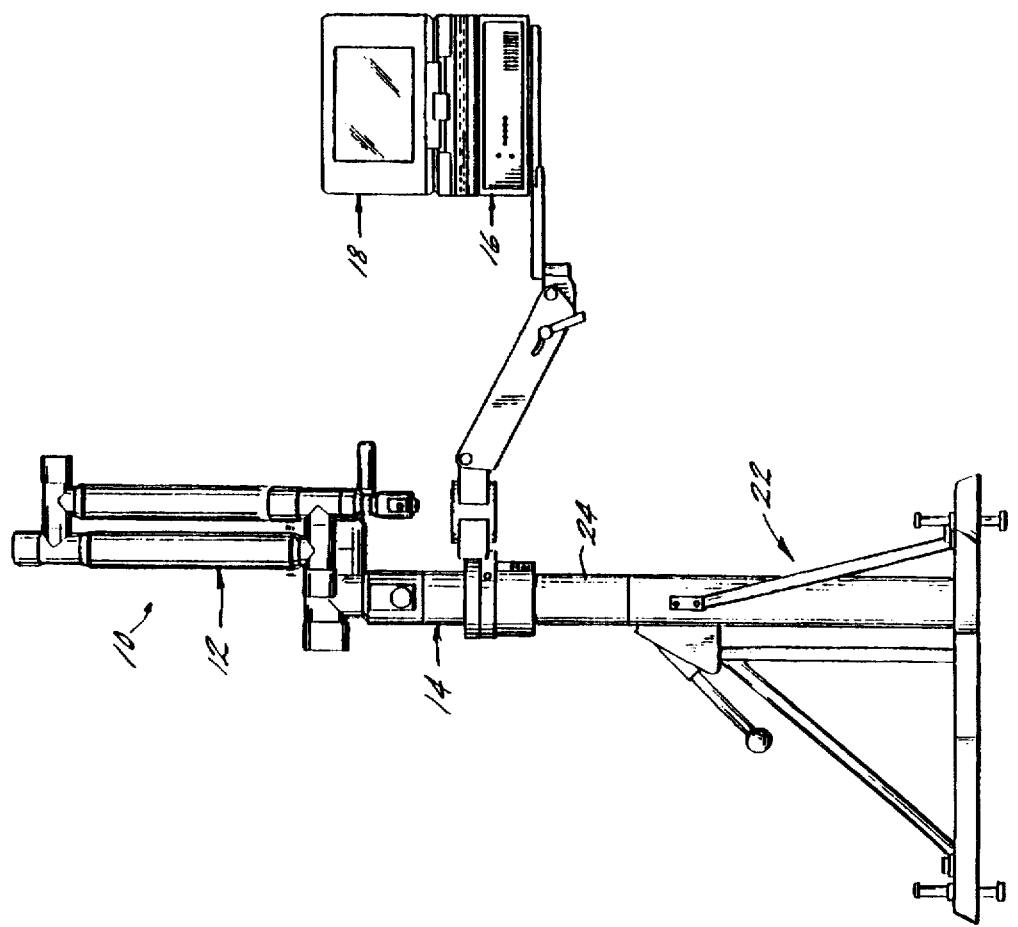

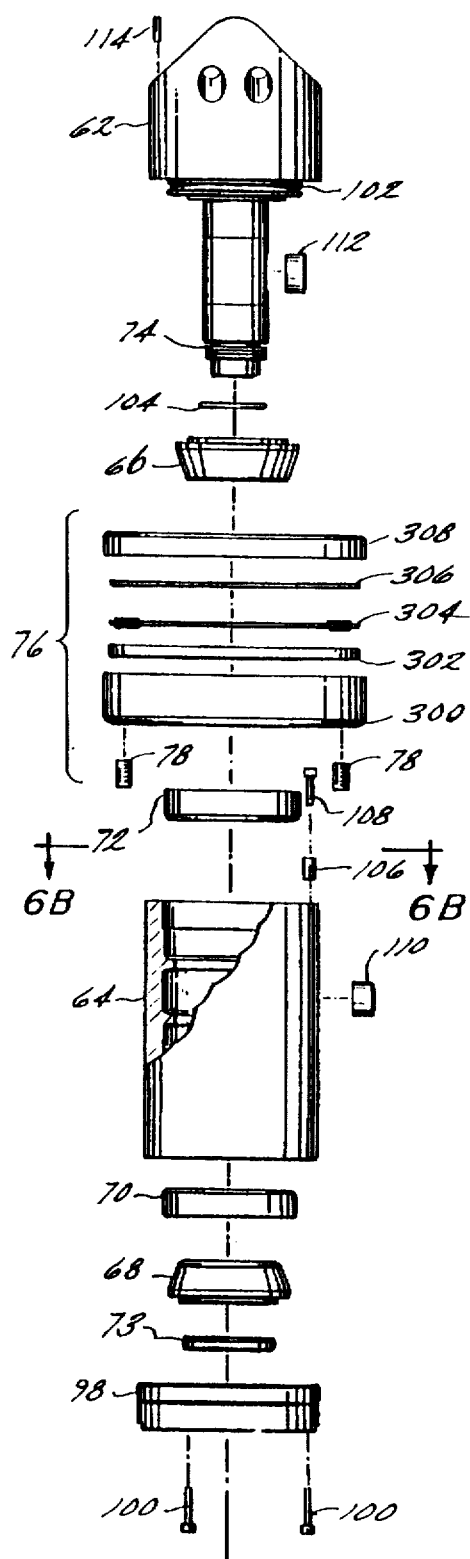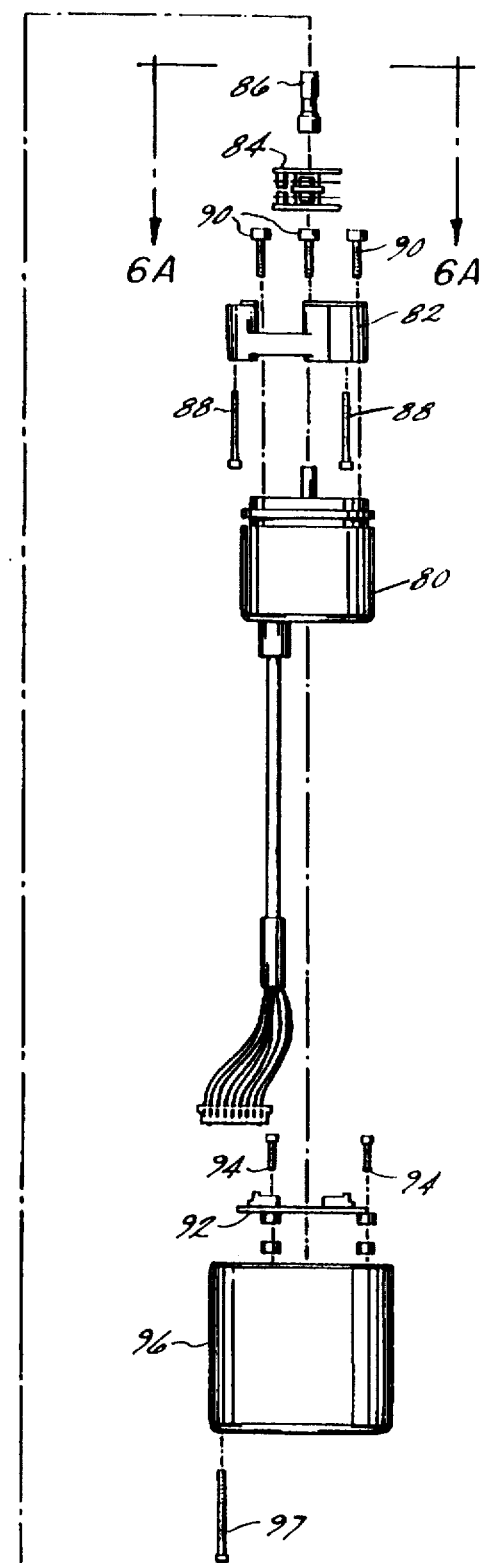
FIG. 6

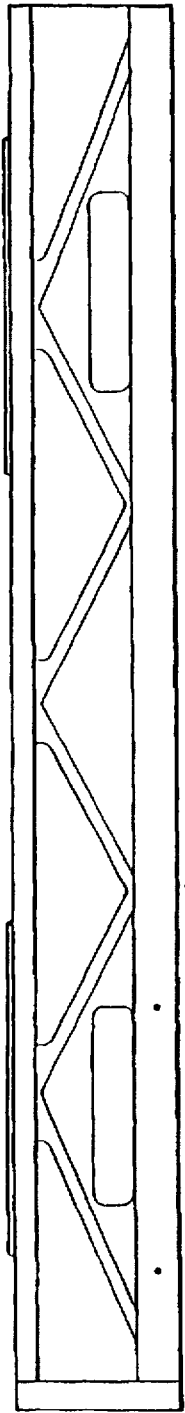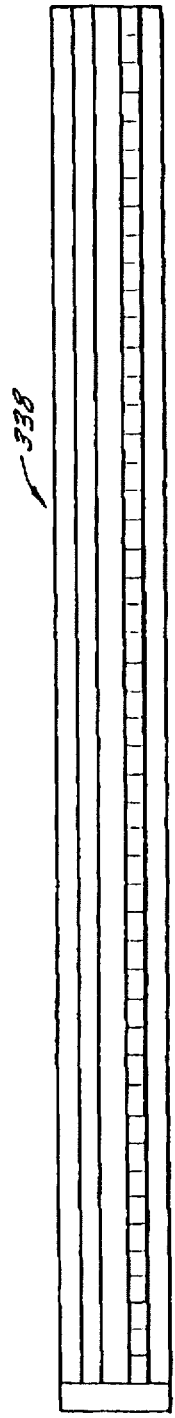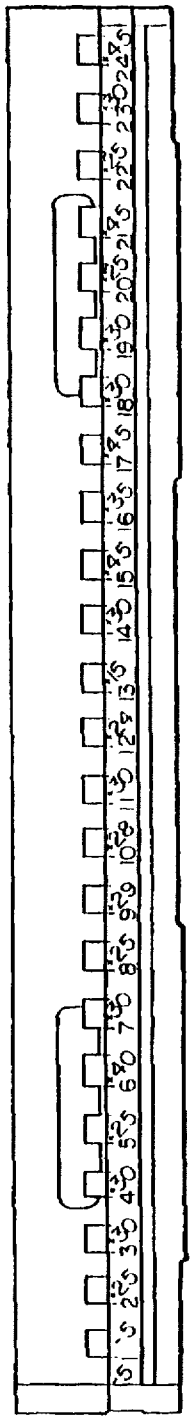

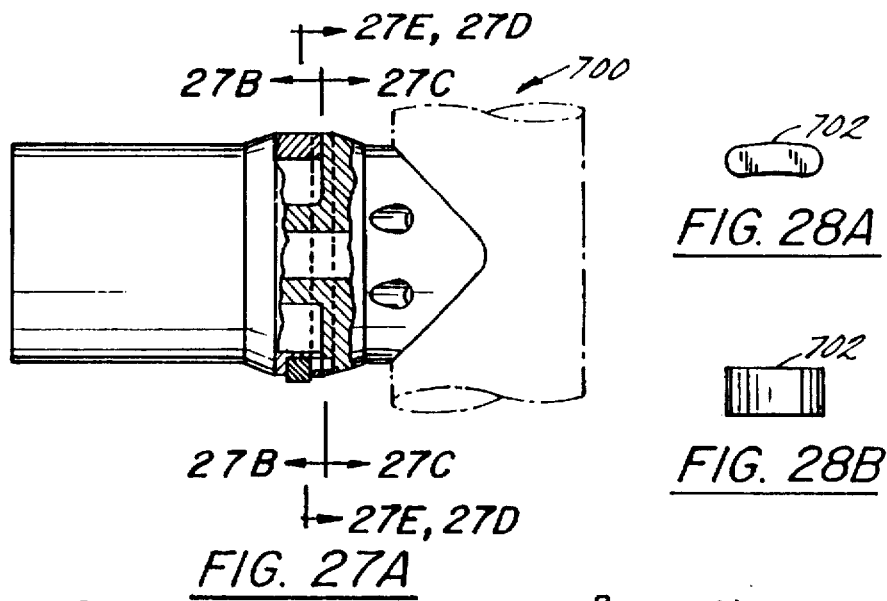
FIG. 28A
FIG. 28B
FIG. 27A
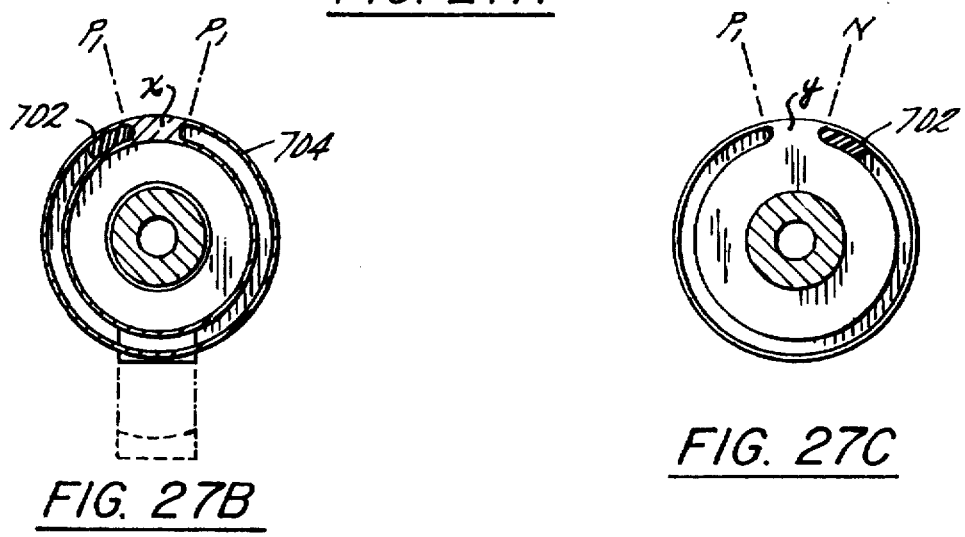
FIG. 27B
FIG. 27C
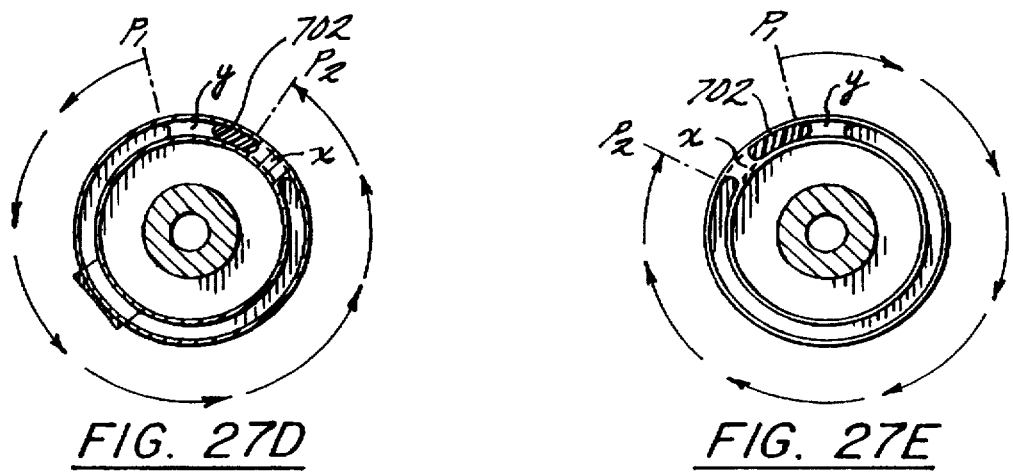
FIG. 27D
FIG. 27E

THREE DIMENSIONAL COORDINATE MEASURING APPARATUS

CROSS-REFERENCE TO RELATED APPLICATION

This is a continuation of U.S. application Ser. No. 08/398,592 filed Mar. 3, 1995, now U.S. Pat. No. 5,611,147.

BACKGROUND OF THE INVENTION

This invention relates generally to three dimensional coordinate measuring machines (or CMM's). More particularly, this invention relates to a new and improved three dimensional CMM which is portable and provides improved accuracy and ease of use.

It will be appreciated that everything in the physical world occupies volume or space. Position in a space may be defined by length, width and height which, in engineering terms, is often called an X, Y, Z coordinate. The X, Y, Z numbers represent the dimensions of length, width and height or three dimensions. Three-dimensional objects are described in terms of position and orientation; that is, not just where an object is but in what direction it points. The orientation of an object in space can be defined by the position of three points on the object. Orientation can also be described by the angles of alignment of the object in space. The X, Y, and Z coordinates can be most simply measured by three linear scales. In other words, if you lay a scale along the length, width and height of a space, you can measure the position of a point in the space.

Presently, coordinate measurement machines or CMM's measure objects in a space using three linear scales. These devices are typically non-portable, expensive and limited in the size or volume that can be easily measured.

FARO Technologies, Inc. of Lake Mary, Fla. (the assignee of the present invention) has successfully produced a series of electrogoniometer-type digitizing devices for the medical field. In particular, FARO Technologies, Inc. has produced systems for skeletal analysis known as METRECOM® and systems for use in surgical applications known as SURGICOM™. Electrogoniometer-type devices of the type embodied in the METRECOM and SURGICOM systems are disclosed in U.S. Pat. No. 4,670,851, 5,251,127 and 5,305,203, all of which are assigned to the assignee hereof and incorporated herein by reference.

While well suited for their intended purposes, the METRECOM and SURGICOM electrogoniometer-type digitizing systems are not well suited for general industrial applications where three dimensional measurements of parts and assemblies are often required. Therefore, there is a continuing need for improved, accurate and low cost CMM's for industrial and related applications.

SUMMARY OF THE INVENTION

The above-discussed and other problems and deficiencies of the prior art are overcome or alleviated by the three dimensional measuring instrument (e.g., electrogoniometer) of the present invention. In accordance with the present invention, a novel, portable coordinate measuring machine comprises a multijointed (preferably six or seven joints) manually positionable measuring arm for accurately and easily measuring a volume, which in a preferred embodiment, comprises a sphere preferably ranging from six to twelve feet in diameter (but which may also cover diameters more or less than this range) and a measuring accuracy of preferably 2 Sigma ±0.0003 inch (and optimally 2 Sigma ±0.001 inch). In addition to the measuring arm, the present invention employs a controller (or serial box) which acts as the electronic interface between the arm and a host computer.

The mechanical measuring arm used in the CMM of this invention is generally comprised of a plurality of transfer housings (with each transfer housing comprising a joint and defining one degree of rotational freedom) and extension members attached to each other with adjacent transfer housings being disposed at right angles to define a movable arm preferably having five, six or seven degrees of freedom. Each transfer housing includes measurement transducers and novel bearing arrangements. These novel bearing arrangements include prestressed bearings formed of counter-positioned conical roller bearings and stiffening thrust bearings or alternatively, standard duplex bearings for high bending stiffness with a low profile structure. In addition, each transfer casing includes physical visual and audio endstop indicators to protect against mechanical overload due to mechanical stressing.

The movable arm is attached to a base or post which includes (1) a temperature monitoring board for monitoring temperature stability; (2) an encoder mounting plate for universal encoder selection; (3) an EEPROM circuit board containing calibration and identification data so as to avoid unit mixup; and (4) a preamplifier board mounted near the encoder mounting plate for transmission of high amplified signals to a remote counter board in the controller.

As in the prior art METRECOM system, the transfer casings are modular permitting variable assembly configurations and the entire movable arm assembly is constructed of one material for ensuring consistent coefficient of thermal expansion (CTE). Similarly as in the METRECOM system, internal wire routing with rotation stops and wire coiling cavities permit complete enclosure of large numbers of wires. Also consistent with the prior art METRECOM system, this invention includes a spring counterbalanced and shock absorbed support mechanism for user comfort and a two switch (take/accept) data entry device for allowing high precision measurements with manual handling. Also, a generalized option of the type used in the prior art METRECOM system is provided for the measurement of variables in three dimensions (e.g., temperature may be measured in three dimensions using a thermocouple attached to the option port).

The use of a discrete microprocessor-based controller box is an important feature of this invention as it permits preprocessing of specific or integrated controller calculations without host level processing requirements. This is accomplished by mounting an intelligent preprocessor in the controller box which provides programmable adaptability and compatibility with a variety of external hosts (e.g., external computers). The serial box also provides intelligent multi-protocol evaluation and autoswitching by sensing communication requirements from the host. For example, a host computer running software from one manufacturer will generate call requests of one form which are automatically sensed by the controller box. Still other features of the controller box include serial port communications for standardized long distance communications in a variety of industrial environments and novel analog-to-digital/digital counter boards for simultaneous capture of every encoder (located in the transfer housing) resulting in highly accurate measurements.

Efficient on-site calibration of the CMM of the present invention is improved through the use of a reference ball positioned at the base of the CMM to obviate potential mounting complications to system accuracy evaluation. In addition, the CMM of this invention includes means for performing a volummetric accuracy measurement protocol on an interim basis, preferably using a novel cone ballbar device.

The above-discussed and other features and advantages of the present invention will be appreciated and understood by those skilled in the art from the following detailed description and drawings.

BRIEF DESCRIPTION OF THE DRAWINGS

Referring to the drawings, wherein like elements are numbered alike in the several FIGURES:

FIG. 3 is a side elevation view of the three dimensional measuring system of the present invention mounted on a theodolite stand;

FIG. 4 is a rear elevation view of the CMM shown in FIG. 1;

FIG. 6 is an exploded, side elevation view of a transfer housing used in the CMM of FIG. 1;

FIGS. 20A-E are respective front, rear, top, right side and left side elevation views of the precision step gauge used in the jig of FIG. 19;

FIG. 27A is a partial diagrammatic view partly in cross section of a second preferred alternative stop arrangement of the transfer housing and shaft that permits 660° of rotation at each freedom of movement in the CMM in accordance with the present invention;

FIG. 27B is a cross-sectional view along the line 27B—27B of FIG. 27A before rotation;

FIG. 27C is a cross-sectional view along the line 27C—27C of FIG. 27A before rotation;

FIG. 27D is a cross-sectional view along the line 27D—27D of FIG. 27A after counterclockwise rotation of 330°;

FIG. 27E is a cross-sectional view along the line 27E—27E of FIG. 27A after clockwise rotation of 330°;

FIG. 28A is a top plan view of a shuttle in accordance with the present invention; and FIG. 28B is a front elevation view of a shuttle in accordance with the present invention.

DESCRIPTION OF THE PREFERRED EMBODIMENT

Figure 1:
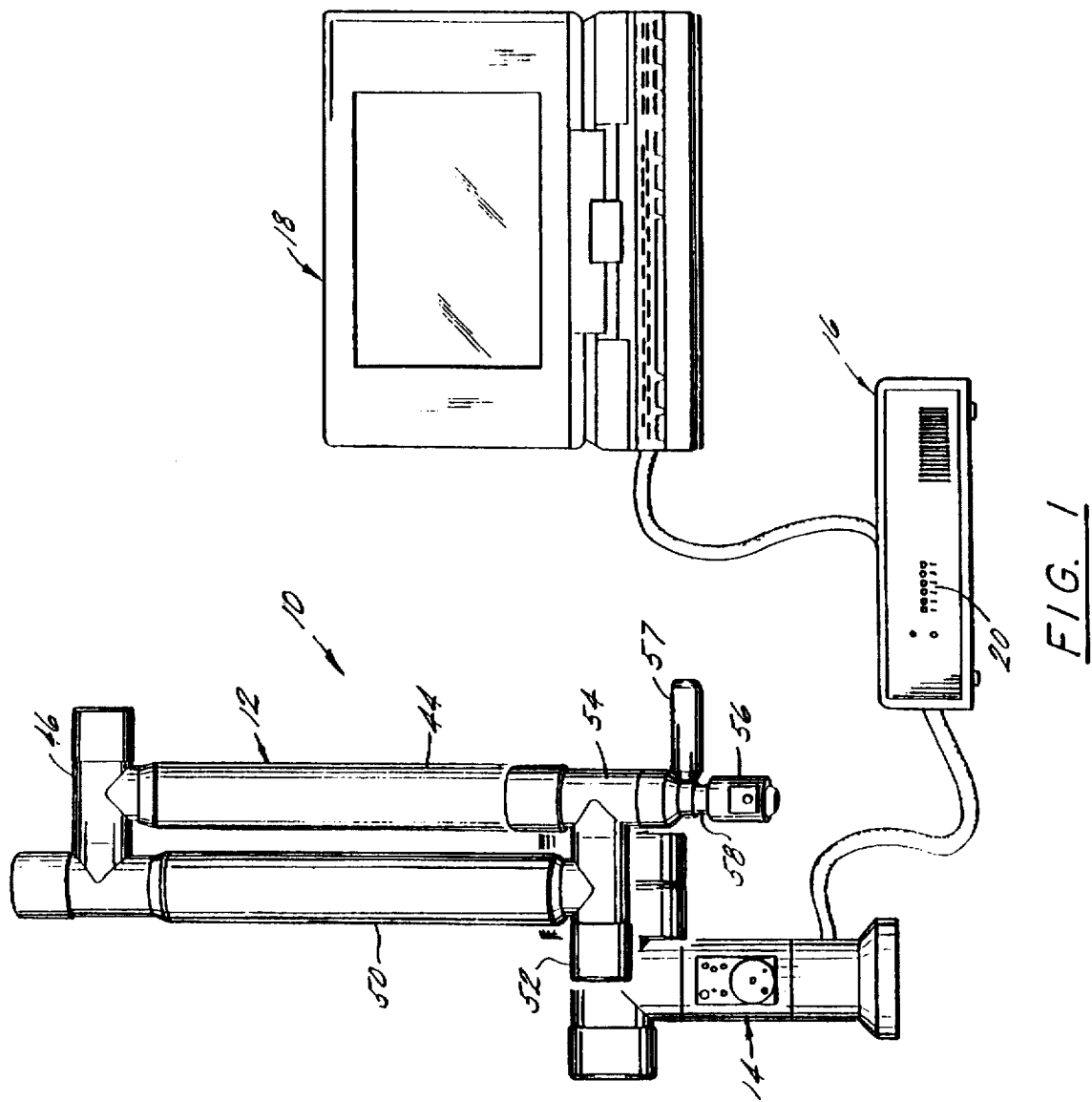
FIG. 1 is a front diagrammatic view depicting the three dimensional measuring system of the present invention including a coordinate measuring machine, a controller box and a host computer.

Referring first to FIG. 1, the three dimensional measuring system of the present invention generally comprises a coordinate measuring machine (CMM) 10 composed of a manually operated multijointed arm 12 and a support base or post 14, a controller or serial box 16 and a host computer 18. It will be appreciated that CMM 10 electronically communicates with serial box 16 which, in turn, electronically communicates with host computer 18.

Figure 2:
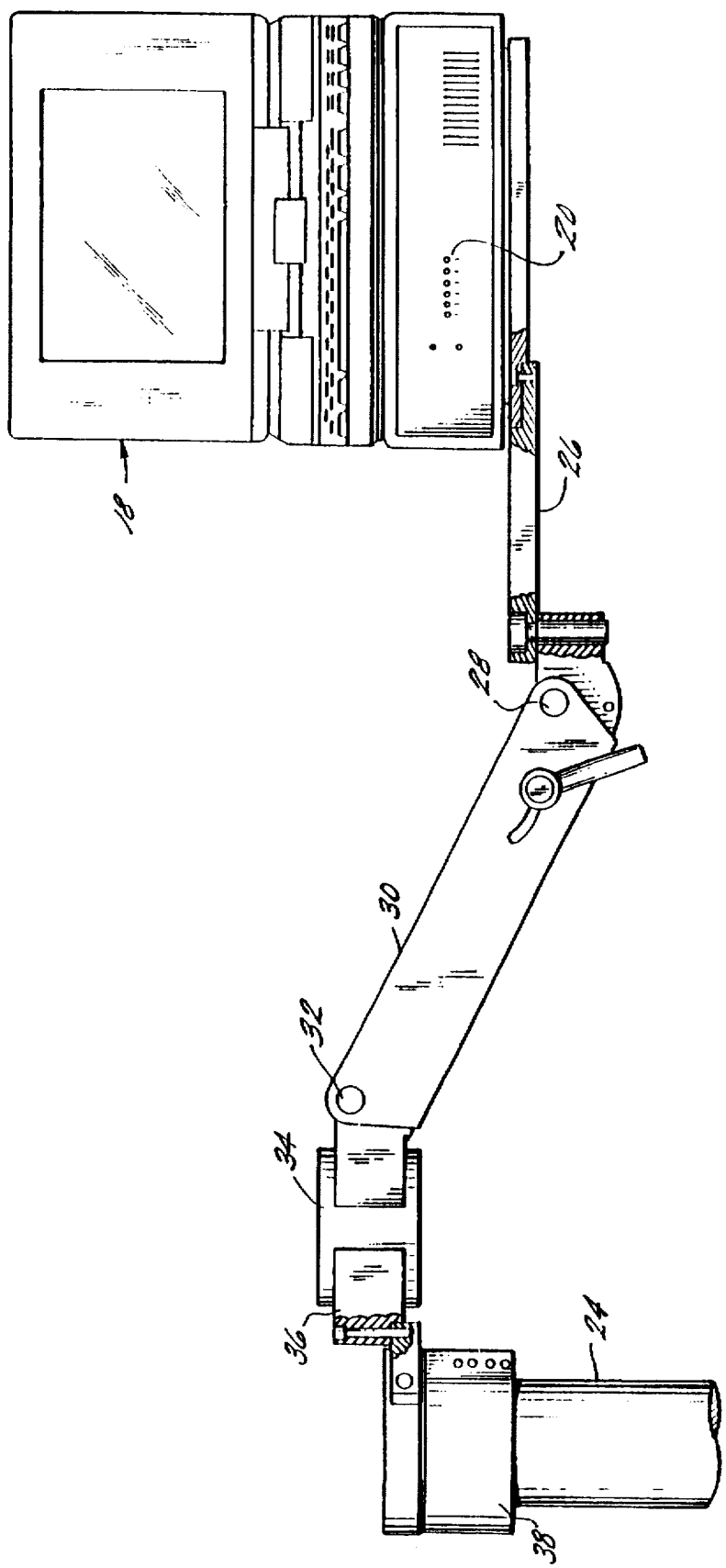
FIG. 2 is a side elevation view depicting the host computer mounted on the serial box, which is in turn, mounted on a maneuverable arm.

As will be discussed in more detail hereinafter, CMM 10 includes transducers (e.g., one transducer for each degree of freedom) which gather rotational positioning data and forward this basic data to serial box 16. Serial box 16 provides a reduction in the overall requirements of host computer 18 to handle certain complex calculations and provides certain preliminary data manipulations. As shown in FIG. 2, serial box 16 is intended to be positioned under the host computer 18 (such as the notebook computer shown in FIG. 2) and includes EEPROMS which contain data handling software, a microcomputer processor, a signal processing board and a number of indicator lights 20. As mentioned, basic transducer data is sent from CMM 10 to serial box 16. Serial box 16 then processes the raw transducer data on an ongoing basis and responds to the queries of the host computer with the desired three-dimensional positional or orientational information.

Preferably, all three components defining the three dimensional measuring system of this invention (e.g., CMM 10, serial box 16 and host computer 18) are mounted on either a fixed mounting surface using a rigid plate and/or a standard optical measurement instrument thread followed by mounting on a known and standard theodolite mobile stand such as shown at 22 in FIG. 3. Preferably, theodolite stand 22 comprises a part no. MWS750 manufactured by Brunson. Such a mobile stand is characterized by a stable rolling platform with an extendable vertical tower and with common attachments and locking mechanisms. As shown in FIGS. 2 and 3, support base 14 of CMM 10 is threaded or otherwise attached onto a vertical support member 24 of stand 22 while serial box 16/host 18 is supported on a shelf 26 pivotally connected at a first joint 28 to an arm 30 which is pivotally connected to a second joint 32. Connecting member 34 interconnects joint 32 to a swivel connection 36 attached to a cap 38 mounted over the top of member 24.

Figure 5:
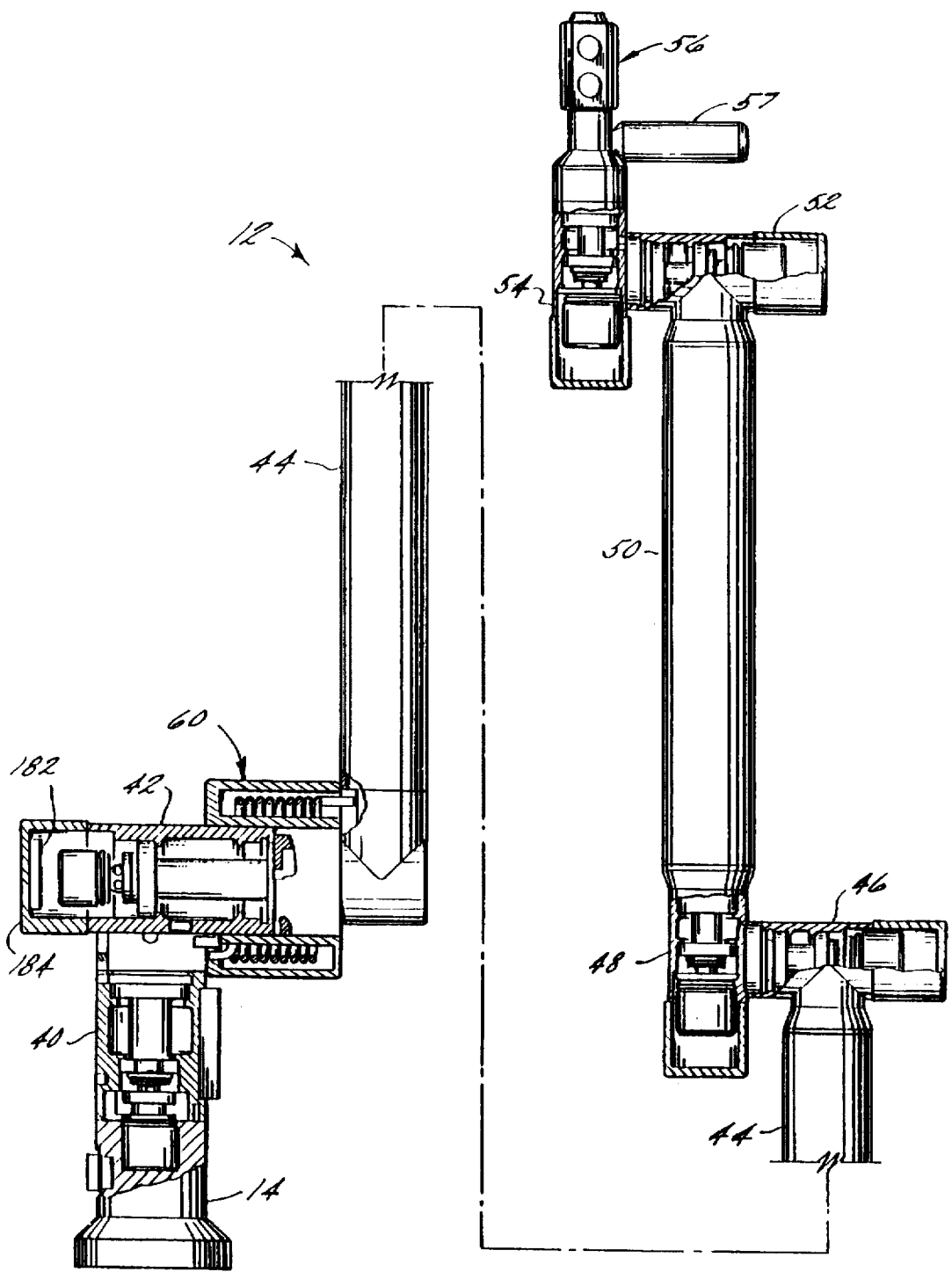
FIG. 5 is a longitudinal view, partly in cross-section of the CMM of FIG. 1.

Referring now to FIGS. 1 and 4-9, CMM 10 will now be described in detail. As best shown in FIG. 5, CMM 10 comprises a base 14 connected to a first set of two transfer housings including a first transfer housing 40 which, in turn, is connected to a second transfer housing 42 (positioned transverse to housing 40). A first extension member 44 is rigidly attached to a second set of two transfer housings including a third transfer housing 46 transversely attached to a fourth transfer housing 48. First extension member 44 is positioned perpendicularly between transfer housings 42 and 46. A second extension member 50 is aligned with an rigidly attached to transfer housing 48. Rigid extension member 50 is rigidly attached to a third set of two transfer housings including a fifth transfer housing 52 transversely attached to a sixth transfer housing 54. Fifth transfer housing 54 has attached thereto a handle/probe assembly 56.

Figure 8:
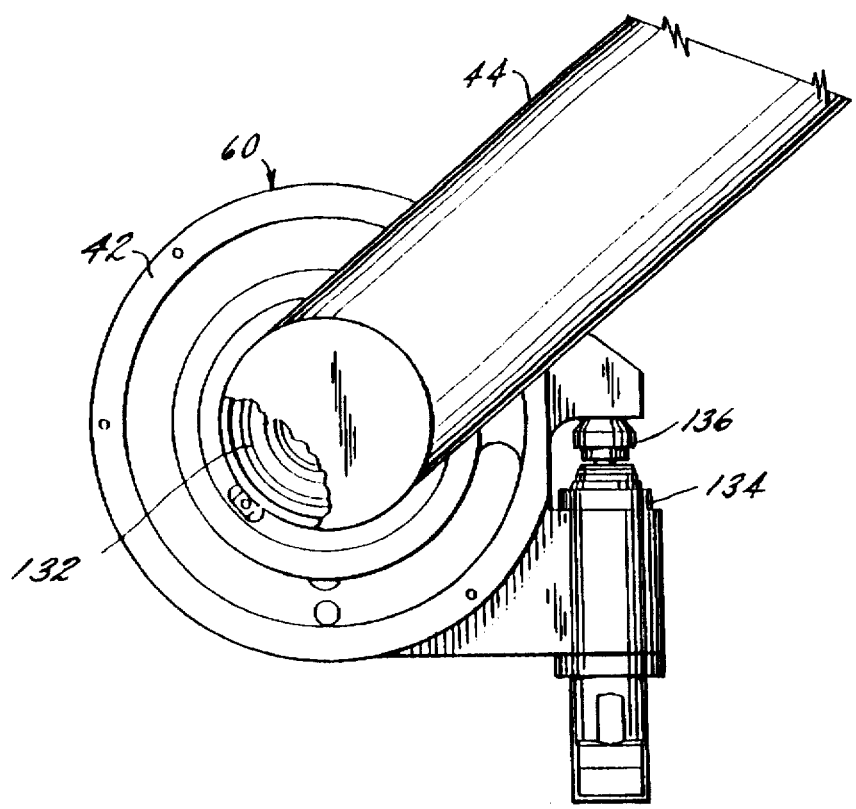
FIG. 8 is an enlarged, side elevation view of a counter-balanced spring device used in the CMM of FIG. 1.

In general (and as will be discussed in more detail hereinafter), position sensing transducers are mounted in each of the six transfer housings 40, 42, 46, 48, 52 and 54. Each housing is comprised of bearing supports and transducer compartments which are made to then cylindrically attach to each other using 45° angled attachment screws (FIG. 6). At the base 14 is a counterbalanced spring device 60 for support of arm 12 in its standard vertical configuration (FIG. 8).

Figure 6A:
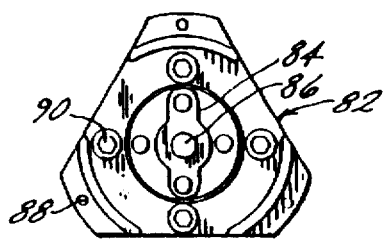
FIGS. 6A and 6B are views along the lines 6A—6A and 6B—6B, respectively, of FIG. 6.
Figure 6B:
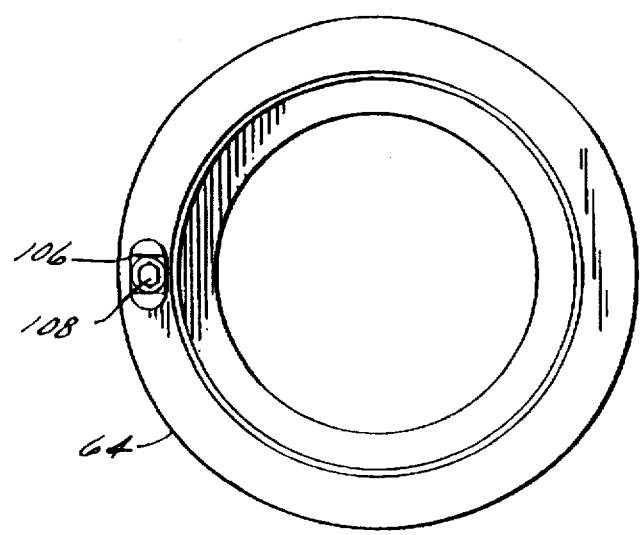
Figure 7:
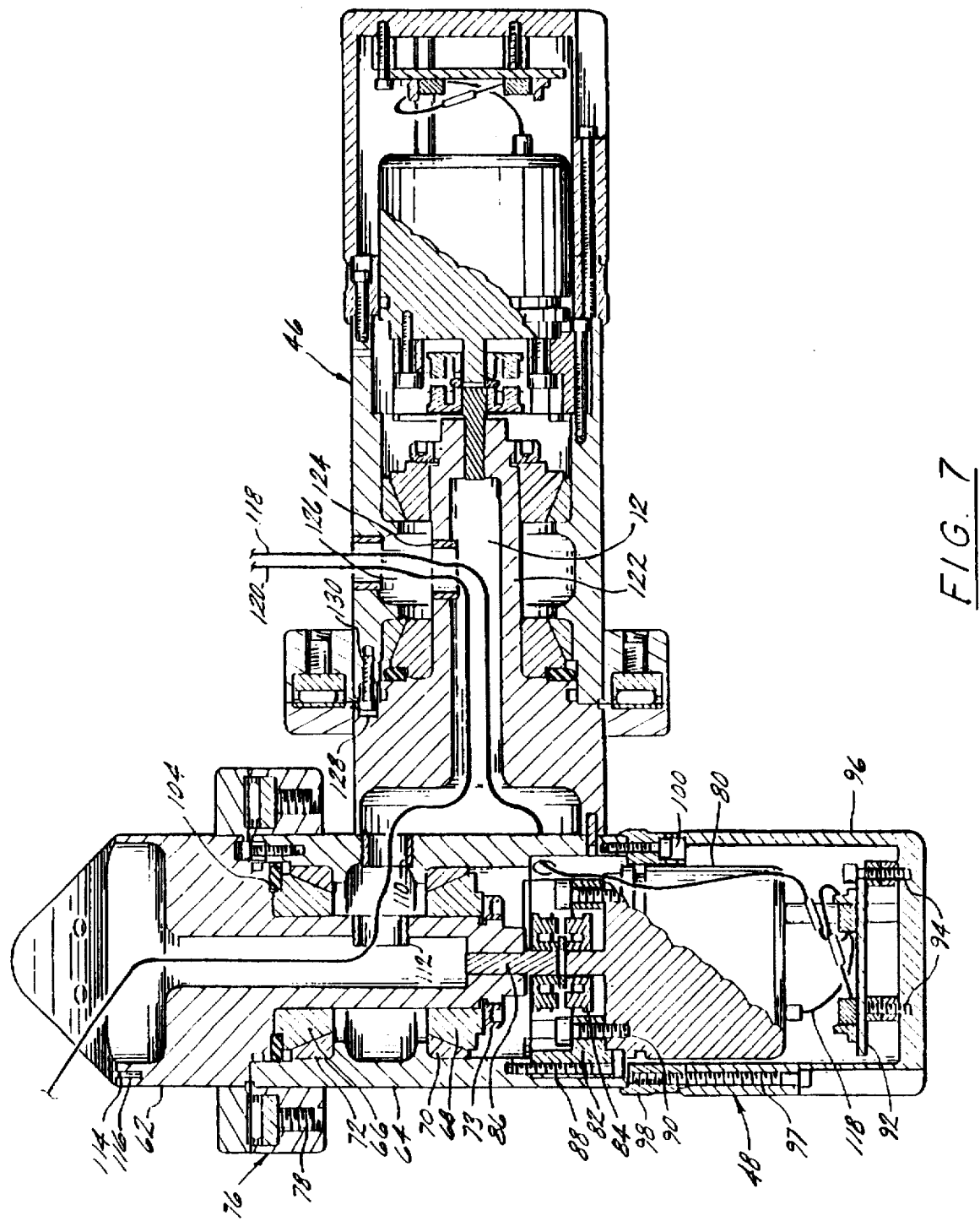
FIG. 7 is a cross-sectional elevation view of two assembled, transversely orientated transfer housings.

Turning now to FIGS. 6 and 7, a detailed description will be made of a transfer housing and its internal components. It will be appreciated that FIG. 6 is an exploded view of a transfer housing, while FIG. 7 shows an enlarged view of the transversely oriented and attached transfer housings (e.g., housings 46 and 48). Each housing includes an internal carrier 62 and an external casing 64. Mechanical stability between internal carrier 62 and external casing 64 is provided by two counter-positioned (e.g., oppositely disposed) conical roller bearings 66, 68 positioned to compress against their respective conical races. 70, 72. Conical races 70 and 72 are permanently affixed into the external transfer casing 64. Carrier includes a shaft 122 extending therefrom and terminating at threading 74. Conical bearings 66, 69 are preferably made from hardened steel while races 70, 72 are also made from hardened steel.

A second preferred alternative bearing arrangement will be discussed hereinafter after the first preferred embodiment is fully described herein for reasons of clarity.

During assembly of transfer casing 48, a compressional force is applied using a nut 73, which is tightened to a specific torque on threads 74, providing a prestressed bearing situation resulting in no motion other than axial rotation under typically applied loads. Because of the necessity of a low profiled or such an arm during manual handling and the attendant reduction in the overall stiffness, it is preferable and, in fact required in certain applications, to also install a thrust bearing 76 at the interface between carrier 62 and casing 64. Thrust bearing 76 provides further mechanical stiffening between carrier 62 and casing 64 of the transfer housing. Thrust bearing 76 comprises five elements including thrust adjustment ring 300, flat annular race 302, roller bearing and cage 304, annular race 306 and opposing thrust cover 308. Thrust bearing 76 is adjusted through a series of set screws 78 and provides for high bending stiffness. The transducer, (preferably an encoder 80 such as is available from Heindenhain under the designation Mini-Rod, part no. 450M-03600), is mounted to a universal mounting plate 82 for mounting into the transfer casing. Universal mounting plate 82 is important in satisfying possible component availability problems such that a change in manufacture of transducer 80 and, hence, the change in mounting screw configuration can be accommodated through modifications in the mounting plate 82. Mounting plate 82 is shown in FIG. 6A as a triangular shaped plate having rounded corners. FIG. 6A also depicts threaded members 88 and 90, a pin 86 and a coupler 84 (all of which are discussed hereinafter).

High accuracy rotational measurements using encoders 80 require that there should be no loads applied to the encoders and that motion of the transfer casing be accurately transmitted to the encoder despite small misalignments of the axis of the transfer casing and axis of the encoder. The angular transfer errors are well known to those skilled in the art from the published encoder literature. Communicating with encoder 80 is a coupler 84 such as is available from Renbrandt under the designation B1004R51R. An extension shaft 86 is utilized for ultimately connecting encoder 80 to the transfer casing 64. Shaft 86 is attached both to coupler 84 and to the end of carrier 62 at threading 74 using set screws 88, 90 (see FIG. 7). In accordance with an important feature of this invention, an electronic preamplifier board 92 is positioned in close proximity to encoder 80 and is mounted (via screws 94) on the inside of cap cover 96. Cap cover 96 is attached to casing 64 via screw 97. A transition housing 98 interconnects cap cover 96 to casing 64 via screw 97 and screws 100. Sealing of the transfer housing to the environment is accomplished at the joint using an O-ring groove 102 in which is mounted a standard rubber O-ring groove 104. A rotational endstop 106 (to be discussed hereinafter), is best shown in FIG. 6B and comprises a square shaped metal housing having an opening therethrough which is mounted onto casing 64 using bolt 108 threaded through the opening of the housing. Wire pass through grommets to stop abrasion over long term use are mounted on both carrier 62 and casing 64 at 110 and 112. A location pin 114 is received by a complimentary shaped recess 116 in carrier 62 for the purpose of maintaining relative orientation of two adjacent transfer casings.

Referring to FIG. 7, for environmental and other reasons, it is important that all wire be completely hidden from sight and, therefore, contained within the arm 12. FIG. 7 depicts two assembled transfer housings 46, 48 mounted perpendicularly to each other and demonstrating the passage of wires. It will be appreciated that during use of CMM 10, the encoder information from encoder 80 is passed to its processor board 92 through wire 118 which is then amplified and passed through the arm by machined passageways 120. Wire 118 then passes through a channel 120 in the shaft 122 of the internal carrier 62 of the transfer casing 46 and through a grommetted hole 124 at which time it passes into a large cavity 126 machined on the external casing 64 of transfer housing 46. Cavity 126 permits the coiling of the wire strands during rotation of the transfer casing and is configured so as not to produce any wire abrasion and a minimum of wire bending. However, because the wire limits the overall ability to fully rotate, an incomplete spherical groove 128 is created in which is positioned an endstop screw, 130 which limits the full rotation, in this case to 330°. A second preferred alternative end stop design which permits 660° of rotation will be discussed hereinafter after the first preferred embodiment is fully described herein for reasons of clarity. It will be appreciated that the pass through channel 120 and wire coiling cavities 122 are subsequently repeated in each transfer casing allowing the wires to progressively make their way down to the connector mounted at the base 14, resulting in no exposed wiring.

Figure 16:
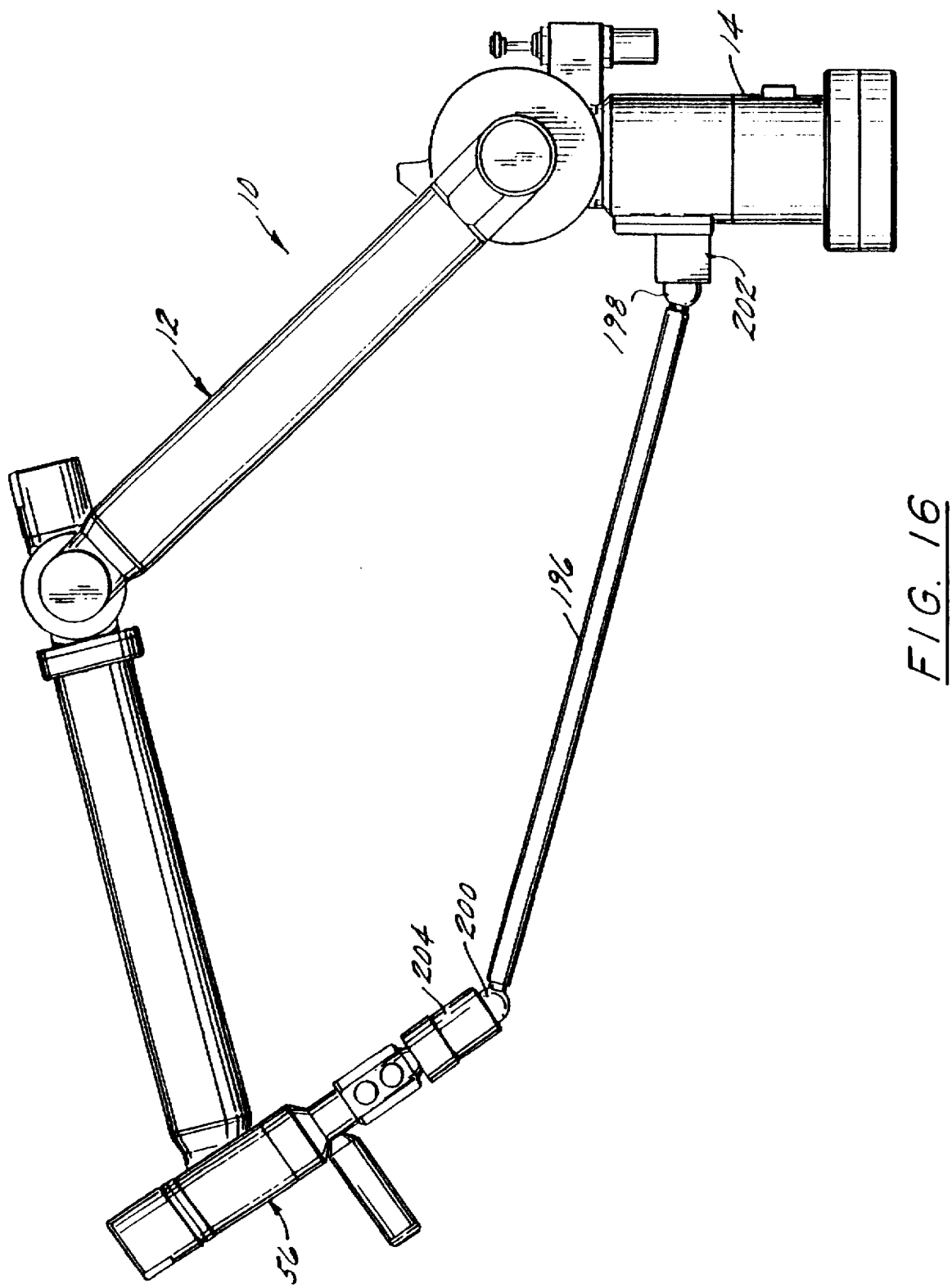
FIG. 16 is a side elevation view of the CMM of FIG. 1 being calibrated with a ballbar.
Figure 17:
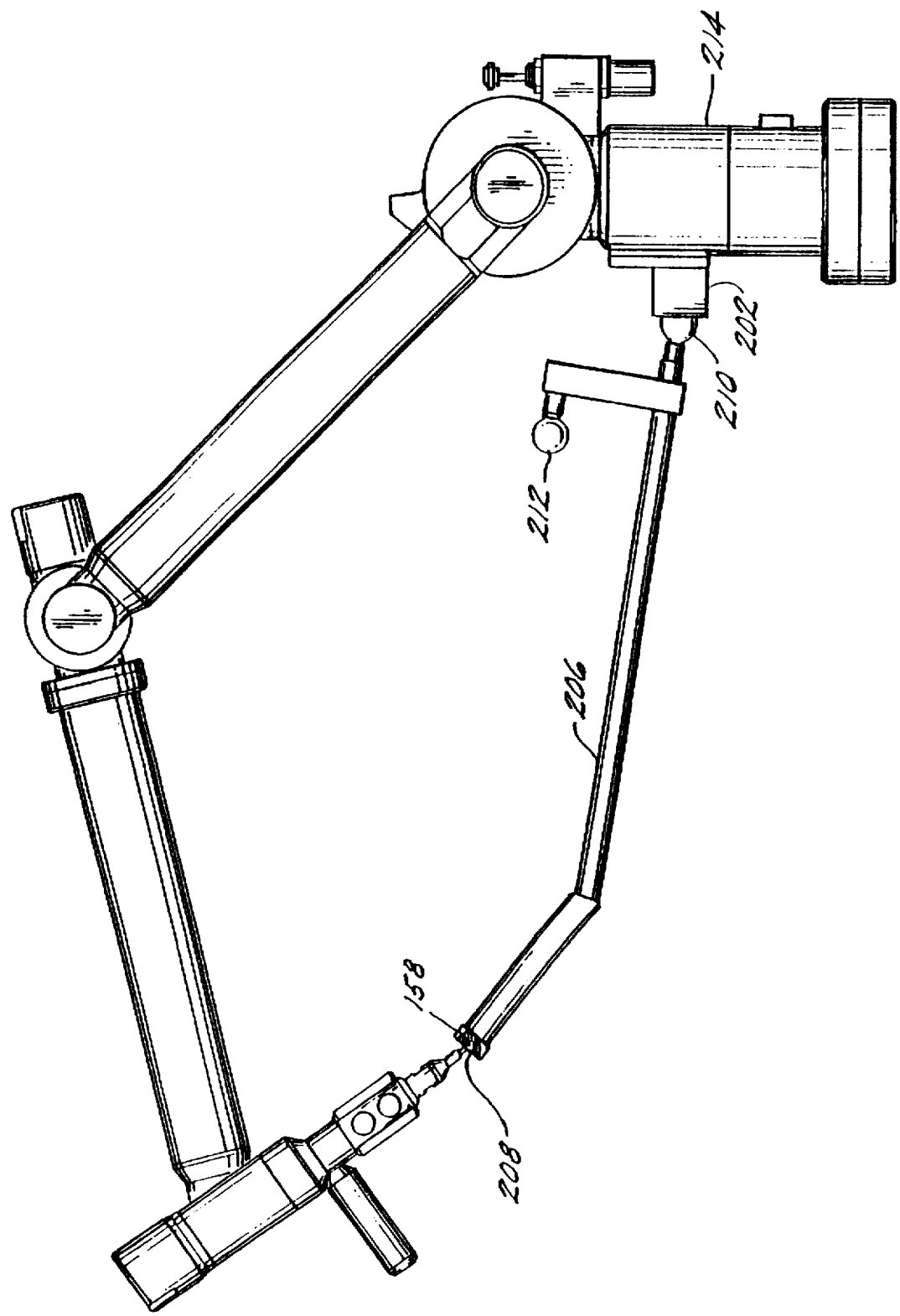
FIGS. 17 and 18 are side elevation views of the CMM of FIG. 1 being calibrated by a novel cone ballbar device.
Figure 18:
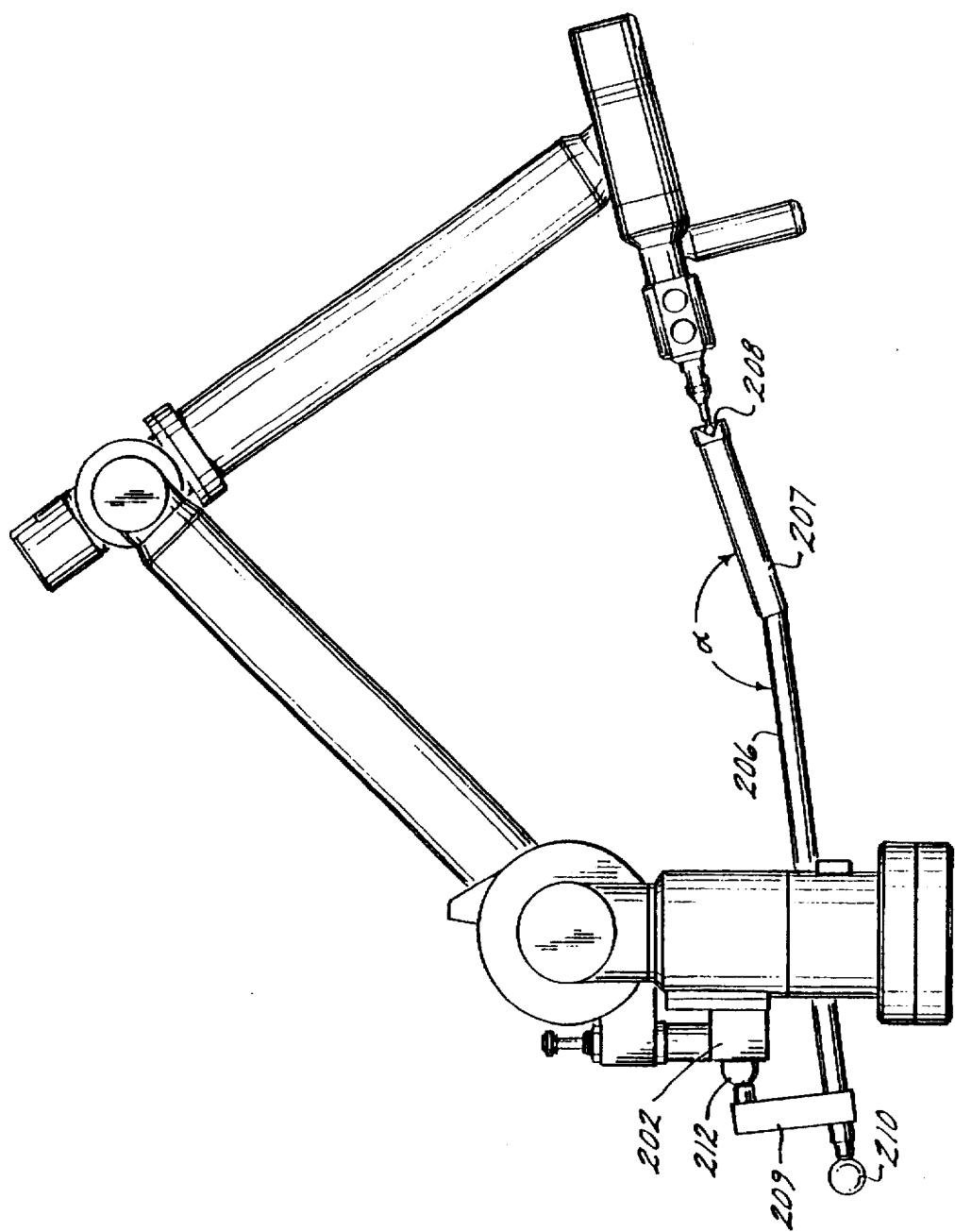

Turning now to FIG. 8, the construction of the aluminum arm as well as the various bearings and transducers results in an accumulated weight of approximately 10 to 15 pounds at the probe handle assembly 56 of CMM 10. Under normal circumstances, this would create a significant amount of fatigue during use and, hence, must be counterbalanced. Weight counterbalances are not preferred since they would significantly increase the overall weight of the device when being considered for transportability. Therefore, in a preferred embodiment counterbalancing is performed using counterbalance device 60 which comprises a torsional spring 132 housed in a plastic casing 134 and mounted at transfer housing 42 at base 14 for providing a lift for arm 12. Coiled torsional spring 132 can be mounted in a variety of positions affecting the overall pretension and, hence, may be usable on a variety of lengths and weights of arms 12. Similarly, due to the weight of arm 12 and the effect of the recoiled spring, significant shock loads may occur when repositioning the arm to the storage position. To prevent significant shocking of the arm upon retraction, air piston shock absorber 134 is also configured into plastic housing 142 of counterbalance spring device 60. This results in an absorption of the shock load and slow relaxation into the rest position. It will be appreciated that FIG. 8 depicts the shock absorber 134 in a depressed configuration while FIGS. 16–18 depict shock absorber 134 in a fully extended position.

Figures 9A, 9B:
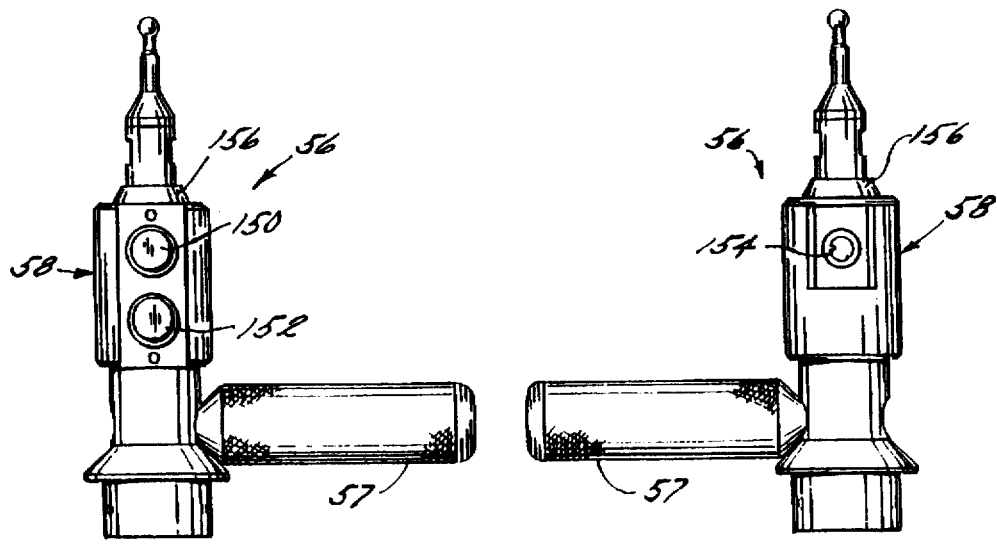
FIGS. 9A and 9B are top and bottom plan views depicting the handle/probe assembly of FIG. 1.

In FIGS. 9A and 9B, top and bottom views of probe handle assembly 56 are shown. Probe handle assembly 56 is meant to be held as either a pencil or pistol grip and possesses two switches (items 150 and 152 in FIG. 9A) for data taking, a connector (item 154 in FIG. 9B) for the attachment of optional electronics and a threaded mount 156 for receiving a variety of probes. Because the CMM 19 is a manual measurement device, the user must be capable of taking a measurement and then confirming to CMM 10 whether the measurement is acceptable or not. This is accomplished through the use of the two switches 150, 152. The front switch 150 is used t trap the 3-dimensional data information and the back switch 152 confirms its acceptance and transmits it to the host computer 18. On the back of the switch enclosure 158 (housing 150, 152) is connector 154 which possesses a number of voltage lines and analog-to-digital converter lines for general attachment to a number of options such as a laser scanning device or touch probe.

Figures 10A, 10B:
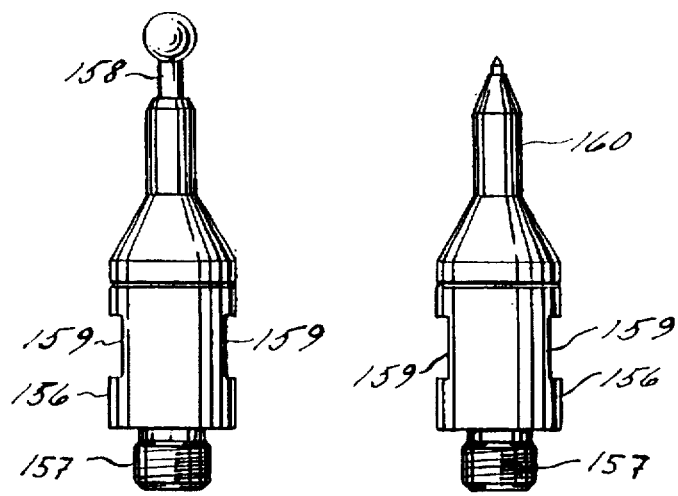
FIGURES 10A and 10B are respective side elevation views of a ball probe and a point probe.

A variety of probes may be threaded to handle assembly 56. In FIG. 10A, hard ¼ inch diameter ball probe 158 is shown while in FIG. 10B, a point probe 160 is shown. Both probes 158, 160 are threadably mounted to mount 156 (using male threaded member 157), which in turn, is threadably mounted to probe housing 58. Mount 156 also includes a plurality of flat surfaces 159 for facilitating engagement and disengagement of the probes using a wrench.

Six additional preferred alternative probe designs will be described hereinafter after the rest of the elements of the first preferred embodiment of CMM 10 have been fully discussed for reasons of clarity.

Figure 11:
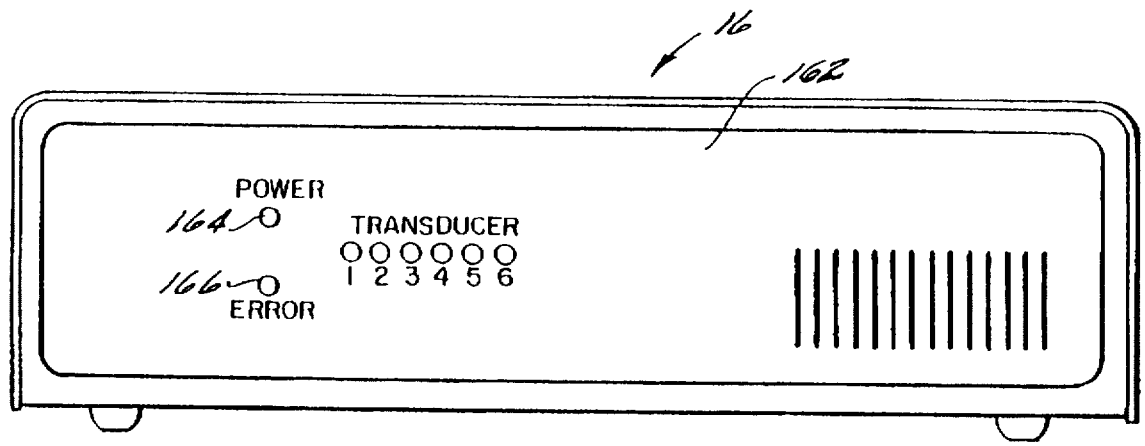
FIG. 11 is an enlarged front view of the controller box of FIG. 1.
Figure 12:
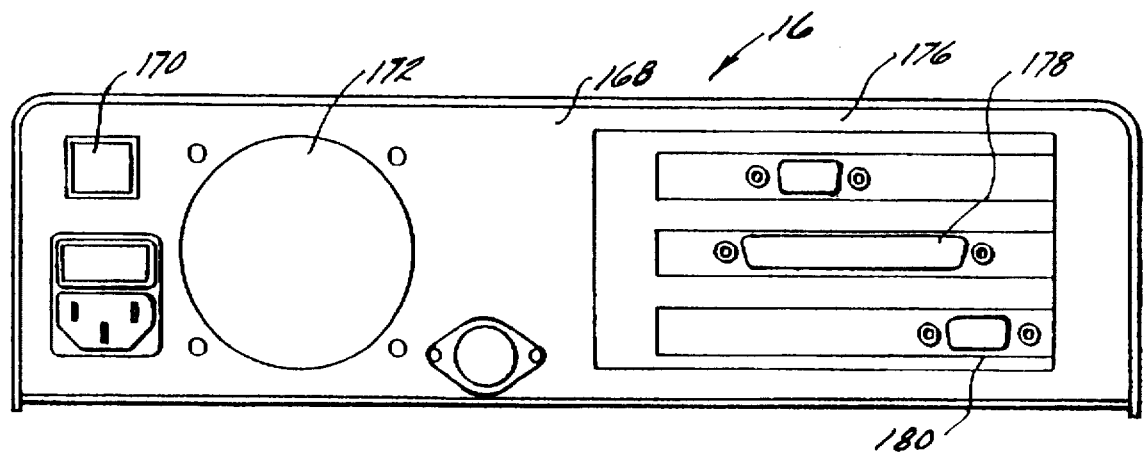
FIG. 12 is an enlarged rear view of the controller box of FIG. 1.

Turning now to FIGS. 11 and 12, a description of the controller or serial box 16 now follows. FIG. 11 shows the front panel face 162 of the controller or serial box 16. Front panel 162 has eight lights including power indicator light 164, error condition light 166, and six lights 20, one for each of the six transducers (identified as items 1–6) located in each transfer housing. Upon powering up, power light 164 will indicate power to the arm 12. At that time, all six transducer lights will indicate the status of each of the six transducers. In a preferred embodiment of this invention, the transducers are incremental digital optical encoders 80 and require referencing. (In a less preferred embodiment, the transducers may be analog devices). Hence, upon start up, each of the six joints (e.g., transfer housings) must be rotated to find the reference position at which time the six lights shall turn off.

In accordance with an important feature of the present invention, during usage, should any of the transducers approach its rotational endstop 106 from within 2 degrees, a light and an audible beep for that particular transducer indicates to the user that the user is too close to the end stop; and that the orientation of the arm should be readjusted for the current measurement. The serial box 16 will continue to measure but will not permit the trapping of the data until such endstop condition is removed. A typical situation where this endstop feature is necessary is the loss of a degree of freedom by the rotation of a particular transducer to its endstop limit and, hence, the applications of forces on the arm causing unmeasured deflections and inaccuracies in the measurement.

At any time during the measurement process, a variety of communication and calculation errors may occur. These are communicated to the user by a flashing of the error light and then a combination of lights of the six transducers indicating by code the particular error condition. It will be appreciated that front panel 162 may alternatively utilize an alphanumeric LCD panel giving alphanumeric error and endstop warnings.

Turning to FIG. 12, the rear panel 168 of serial box 16 includes a variety of standard PC connectors and switches including a reset button 170 which resets the microprocessor; an AC input fan 172 for air circulation; a connector 174 for a standard PC AT keyboard, connector 176 for an optional VGA board for monitoring of the internal operations of serial box 16, connector 178 for receiving the variety of signal lines for the CMM data, and connector 180 for the standard RS232 connector for the host 18.

Serial box 16 is responsible for monitoring the temperature of the CMM and in real time modifying the kinematics or mathematics describing its motion according to formulas describing the expansion and contraction of the various components due to changes in temperature. For this purpose, and in accordance with an important feature of this invention, a temperature monitoring board 182 (which includes a temperature transducer) is positioned at the location of the second joint 42 on the interior of a cover 184 (see FIGS. 4 and 5). CMM 10 is preferably constructed of aircraft grade aluminum externally and anodized. Preferably, the entire arm 12 is constructed of the same material except for the mounting screws which are stainless steel. The same material is used throughout in order to make uniform the expansion and contraction characteristics of arm 12 and make it more amenable to electronic compensation. More importantly, the extreme degree of stability required between all parts through the large temperature range requires that there be no differential thermal expansion between the parts. As mentioned, the temperature transducer 182 is preferably located at transfer housing 42 because it is believed that this location defines the area of highest mass and is therefore the last area to be stabilized after a large temperature fluctuation.

Figure 13:
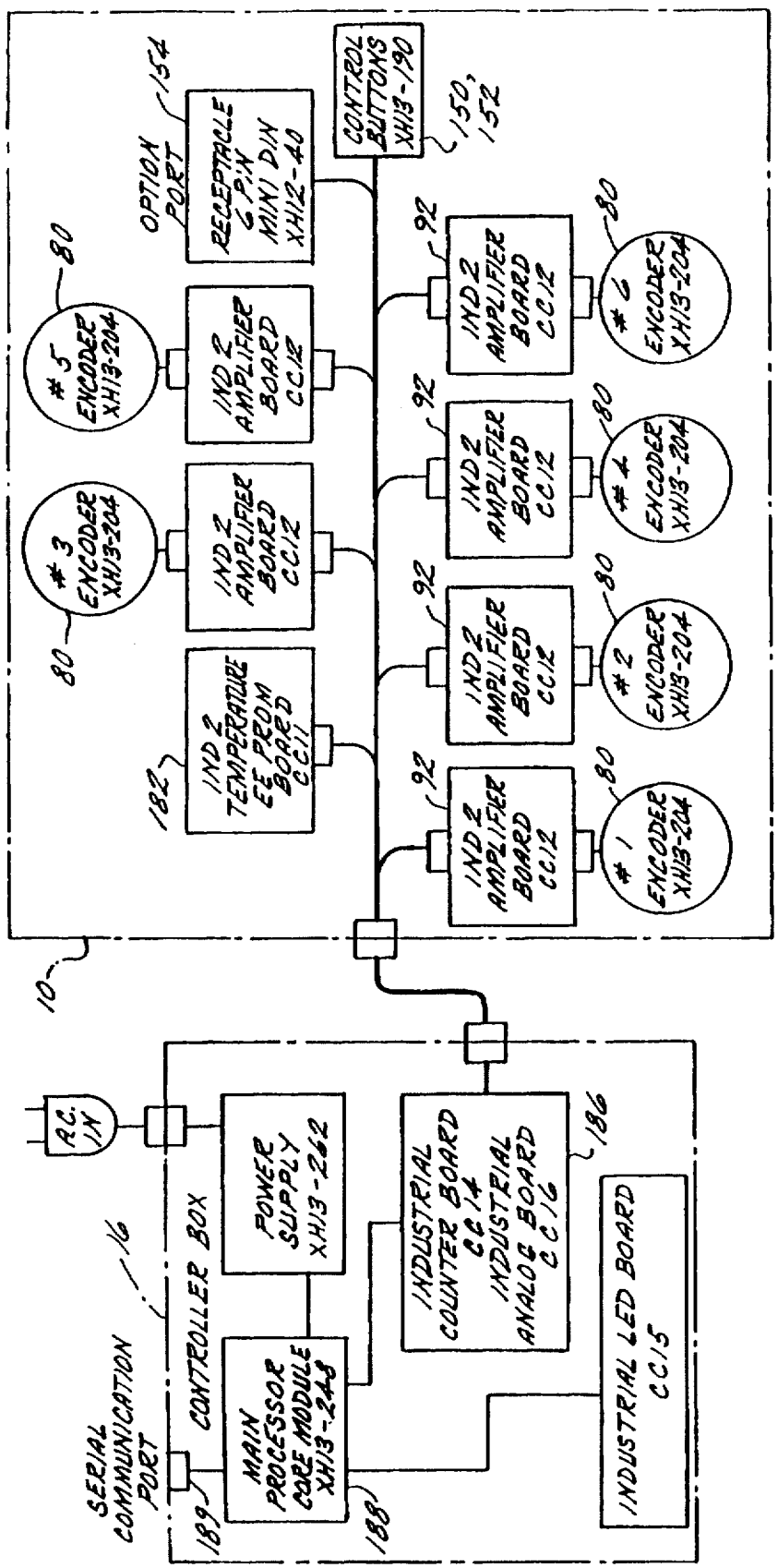
FIG. 13 is a schematic view of the electronic components for the three dimensional measuring system of FIG. 1.

Referring now to FIG. 13, the overall electronic schematic layout for CMM 10 and serial box 16 is shown. Six encoders 80 are shown with each encoder having an amplifier board 92 located in close proximity to it for the minimization of noise on signal transfer. An option port 154 is shown which is a six pin connector available at the handle 56 for the attachment of a variety of options. Two control buttons 150 and 152 for indicating to serial box 16 the measurement process, are also shown.

The temperature transducer is associated with a temperature circuit board 182 which is also located in arm 12 as shown in FIG. 13. In accordance with still another important feature of this invention, the temperature board 182 comprises an EEPROM board. The EEPROM is a small computerized memory device (electrically erasable programmable read only memory) and is used to contain a variety of specific calibration and serial number data on the arm (see discussion regarding FIGS. 19–21). This is a very important feature of this invention which permits high quality control of CMM 10 and importantly, precludes the inadvertent mixup of software and arms. This also means that the CMM arm 12 is a stand alone device not requiring specific calibration data to reside in controller box 16 which may need to be separately serviced and/or switched with other machines.

The electronic and pulse data from the arm electronics is then transmitted to a combined analog-to-digital converter/digital counting board 186 which is a paired set comprising a 12 bit analog to digital converter and a multi channel 16 bit digital counter. Board 186 is positioned on the standard buss of the controller box. The counting information is processed using the core module 188 (comprising a commercially available Intel 286 microprocessor such as a part number CMX-286-Q51 available from Ampro) and programs stored on an EEPROM also residing in the controller box. Subsequent data is then transmitted through the serial communication port 189.

The microprocessor-based serial box 16 permits preprocessing of calculations specific to CMM 10 without host level processing requirements. Typical examples of such preprocessor calculations include coordinate system transformations; conversion of units; leap-frogging from one coordinate system to another by using an intermediary jig; performance of certain certification procedures, including calculations of distance between 2 balls (such as in ANSI B89 ballbar); and outputting data in specific formats required for downloading to a variety of hosts and user programs.

The serial box is configured to communicate with a variety of host formats including PC, MSDOS, Windows, Unix, Apple, VME and others. Thus, the serial box processes the raw transducer data on an ongoing basis and responds to the information requests or polling of the host computer with the desired three dimensional positional or orientational information. The language of the serial box is in such a form that drivers or computer communication subroutines in microprocessor 188 are written in the language of the host computer so as to drive the serial port and communicate with CMM 10. This function is designated the "intelligent multi-protocol emulation and autoswitching" function and works as follows: A variety of host programs may be installed on the host computer. These host programs will poll the serial port with a variety of requests to which the serial box must respond. A number of protocols have been preprogrammed into the serial box to respond to polls or inquiries on the serial port for a variety of different, popular software. A polling request by a software requires a specific response. The serial box will receive the polling request, establish which protocol it belongs to, and respond in the appropriate manner. This allows transparent communication between CMM 10 and a wide variety of application software such as computer aided design and quality control software, e.g., AutoCad® from Autodesk, Inc., CADKEY® from Cadkey, Inc., and other CAD programs; as well as quality control programs such as GEOMET® from Geomet Systems, Inc. and Micromeasure III from Brown and Sharpe, Inc.

The three dimensional CMM of the present invention operates as follows. Upon power up, the microprocessor 188 in the serial box 16 undergoes start up self-checking procedures and supplies power through the instrument port to arm 12 of CMM 10. The microprocessor and software residing on EEPROM 182 determines that upon initial power up none of the encoders 80 have been initialized. Hence, the microprocessor 188 sends a signal to the display board lighting all the lights 20, indicating a need to be referenced. The user will then mechanically move the arm which will cause the transducers to individually scan their range, at which time a reference mark is passed. When the reference mark is passed, the digital counter board 186 responds by trapping its location and identifying to the front display board 20 that the transducer has been referenced and the light is extinguished. Once all transducers have been referenced, the system establishes serial communication with the host and waits for further instruction. Pressing of the front or back button of handle 56 will initiate a measurement process. Pressing the front button 150 will trap the current transducer readings. Pressing the back button 152 will indicate to the microprocessor that these values are to be translated into dimensional coordinates and issued through the serial port to the host 18. The host 18 and the serial box 16 will then continue to react to each other's serial line requests.

Figure 19:
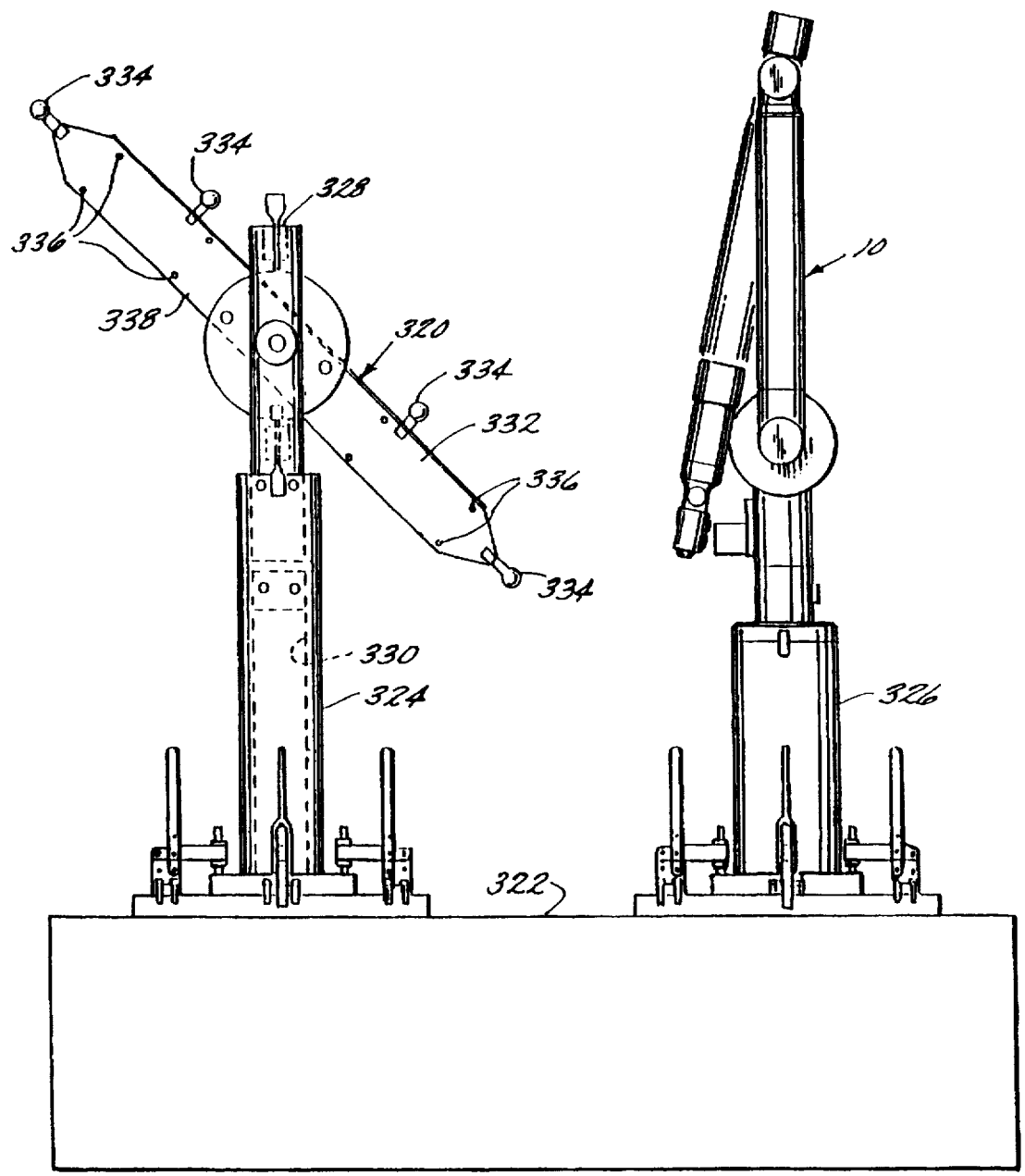
FIG. 19 is a side elevation view depicting a method for optimizing the CMM of FIG. 1 using an optimization jig.
Figure 21:
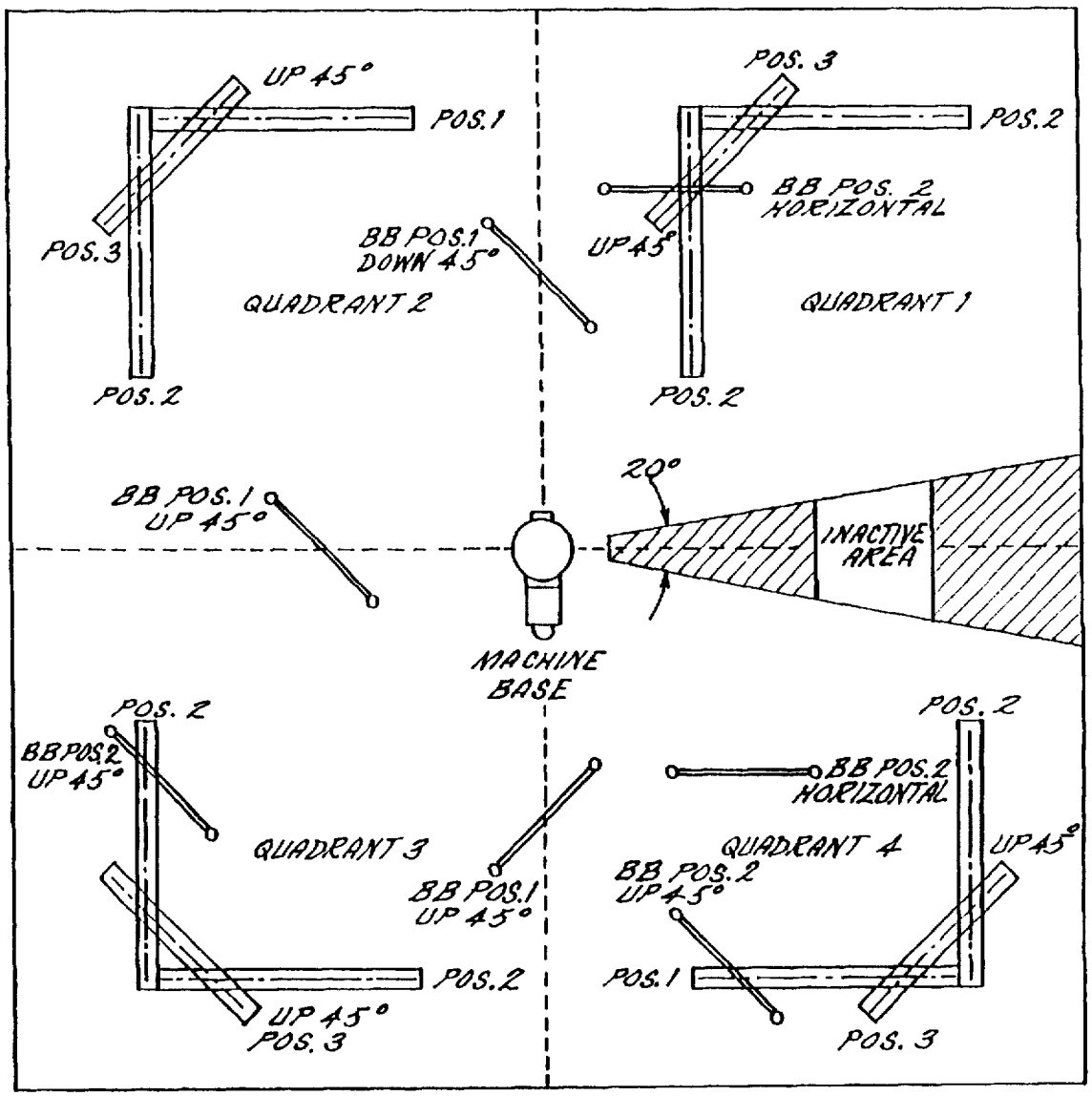
FIG. 21 is a schematic view showing a method of optimizing the CMM of FIG. 1 utilizing the apparatus of FIG. 19.

Turning now to FIGS. 19, 20 and 21 subsequent to assembly of CMM 10, the device is optimized or calibrated by altering the program software to account for any measured imperfections in assembly or machining. This initial calibration is an important feature of this invention and is accomplished in two stages. First, a variety of dimensional measurements are made which include positions, orientations and dimensions throughout the entire volume of the device. Subsequently, an optimization software program is used to determine the actual misalignments exiting at each of the joint axes and, hence, adjusting the kinematic formulas describing the motion of the arm. The general result is that imperfect machining and assembly is rendered perfect through the identification of those imperfections and their inclusion in the kinematics of the device.

Referring to FIGS. 19 and 20A-E, due to the huge amount of data and the requirement that it be accurately and easily obtained, a calibration and testing jig is shown at 320. Jig 320 is comprised of a large granite plate 322 to which is attached two spaced towers 324, 326 which can rotate 360 degrees in the horizontal plane. The CMM 10 is mounted on tower 326 and the adjustable dimensional testing jig 320 is mounted on the other tower 324. Jig 320 is mounted on an extendable vertical arm 328 which is vertically displaceable within an opening 330 through tower 324. Arm 328 is shown in a fully extended position.

Still referring to FIGS. 19 and 20, the adjustable dimensional testing jig 320 is comprised of three basic components: a 24 inch bar 332 on which is found a set of precision balls 334, a series of holes 336 positioned along its length, and a 24 inch precision step gauge 338 (shown in detail in FIGS. 20A-E) Arm 332 is used to measure the positions of the holes, steps and balls in a variety of positions for the testing jig and in all areas of the volume of the arm as shown in FIG. 21. This data is then optimized. In summary, the important optimization procedure can be described as follows. Standard test jig 320 with predetermined positions and orientations of objects is measured by arm 10. The data is then processed through a multi-variable optimization program created to provide the relative misalignment and dimension of all major components of the arm. Optimization is performed, at which time a calibration file is produced containing the overall characteristics of the arm. These overall characteristics and subsequent transducer readings are combined in a variety of kinematic formulas which will generate the X, Y and Z values in an absolute coordinate system.

Figure 14:
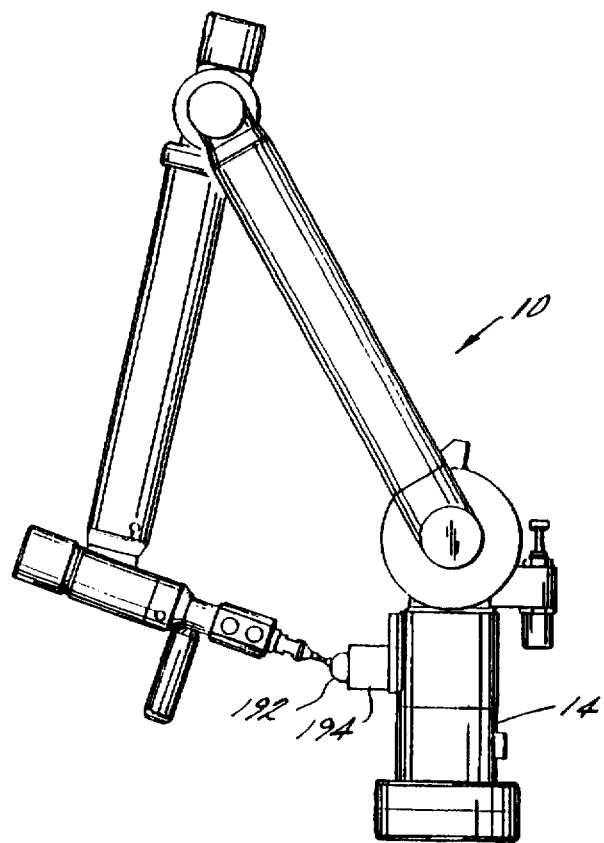
FIG. 14 is a side elevation view of the CMM of FIG. 1 depicting a probe tip calibration system.
Figure 15:
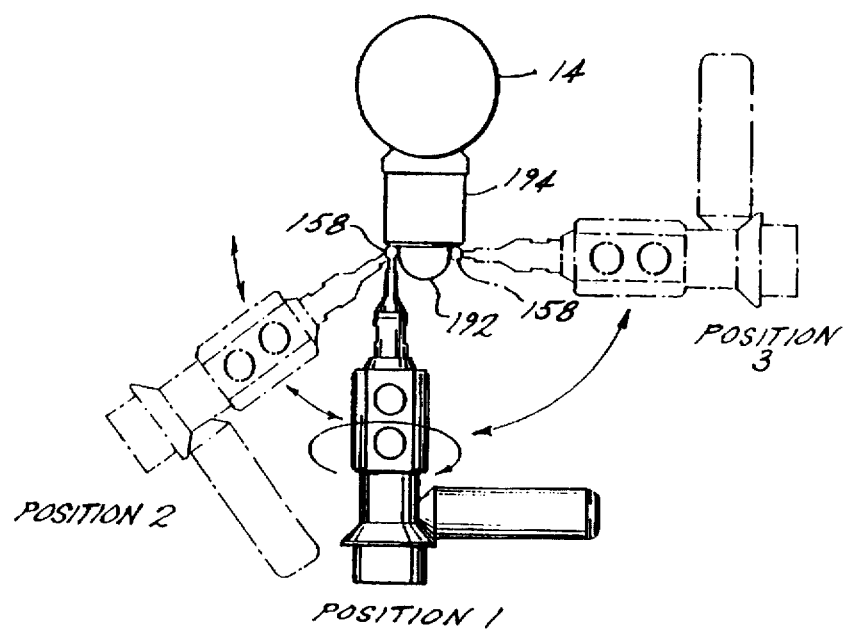
FIG. 15 is a schematic top plan view showing a method of calibrating the probe tip.

In order to further optimize performance, a novel reference ball 192 extends laterally from a detachable mount 194 attached to base 14 of CMM 10 (see FIGS. 14 and 15). By locating reference ball 192 at base 14, ball 92 represents the absolute origin of the device (0, 0, 0) corresponding to the X, Y and Z axes. Because of the known position of reference ball 192, positioning of the tips, as shown in FIG. 15, allows the present invention to determine the coordinates of the digitizer tip 158 in relationship to the last link of CMM 10. Knowledge of this position allows CMM 10 to determine the position of the center of that ball when making subsequent measurements. In a general sense, this means that a variety of different probes may then be attached depending on the particular application and each can be calibrated against the reference ball.

Because of the portable nature of the present invention, it will be subjected to significant mishandling and repositioning in a variety of environments. Therefore, the present invention includes a protocol by which the user may establish a degree of volummetric accuracy prior to using a device according to a convenient maintenance schedule. Volummetric accuracy is defined, according to ASME ANSI B891.1.12 (1989) standard, as the ability of a device to measure a fixed length which is positioned in its working volume in a variety of orientations. FIG. 16 shows the capability of this invention to do this using a first ballbar approach while FIGS. 17 and 18 depict a second ballbar approach.

FIG. 16 shows a standard ballbar 196 at each end of which is positioned a precision spherical ball 198, 200 which are mounted respectively into two magnetic sockets 202 and 204. Socket 202 is located at base 14 of CMM 10 and socket 204 is located at probe handle 56. As arm 12 is moved about, the sockets 202, 204 and balls 198, 200 rotate to accommodate this movement and CMM 10 is required to measure the fixed distance between the center of ball 200 and socket 204 at the handle 56 and the center of ball 198 at the base. Remembering, of course, that socket 202 at base 14 represents the 0, 0, 0 coordinate of CMM 10, calibration software in control box 16 then calculates the vector length from the 0, 0, 0 to the center of the ball at the probe and this length, which, of course, is unchanging during the test, must measure constantly throughout the entire volume through multiple configurations and rotations of the handle and other joints.

It will be appreciated that the socket 204 at the handle, may tend to be inconvenient and inconclusive when wanting to verify the accuracy of a particular probe on the handle. Hence, in accordance with an important feature of this invention, a novel cone socket ballbar as shown at 206 in FIG. 17 is used. Cone socket ballbar 206 includes a cone 208 at one end and two balls 210, 212 at the other end. The cone and balls are interconnected by a bar 207 having an angled portion 209 with then angle α preferably comprising 20 degrees. Ball 212 is attached to a mount 211 which extends laterally from bar 207. A ball probe 158 or point probe 160 is positioned in cone socket 208 and ball 210 can be mounted in the standard magnetic socket 202 of base 14 of CMM 10. As in the calibration method of FIG. 16, a number of positions of the ball and bar and joint positions are measured and the distance between cone socket 208 and ball 210 must remain constant. It is the nature of the positioning of ball socket 202 that the user will not be able to reach on the far side of the machine (position shown by Item 214). To this end, ball 212 is used as shown in FIG. 18. This allows the user to position cone ballbar 206 so as to reach on the reverse far side of CMM 10 in order to measure the distance between the center of ball 212 and the center of cone socket 208.

One of the most severe problems encountered with the use of the CMM (portable coordinate measuring machine) in accordance with the present invention is that the stand or base on which the arm is mounted through a loading plate may not be entirely stable with respect to the item which is being measured. This is caused by the fact that the loading plate to which the base of the arm is mounted may not be entirely stable with respect to the item being measured because the measured item is fixed to a separate mounting table or is part of a larger assembly. This instability can adversely affect the high accuracy of the CMM. To resolve this problem, strut supports are provided which are mounted at the one end to threaded holes aimed radially outward from the base loading plate and at the second end are fitted with universal clamps (i.e., C-clamps). The strut support is provided with an adjustment screw to adjust the length of the strut to properly reach the measured item. The strut is intended to be used in pairs preferably by means of an identical strut on the opposite side of the base loading plate.

Figure 22:
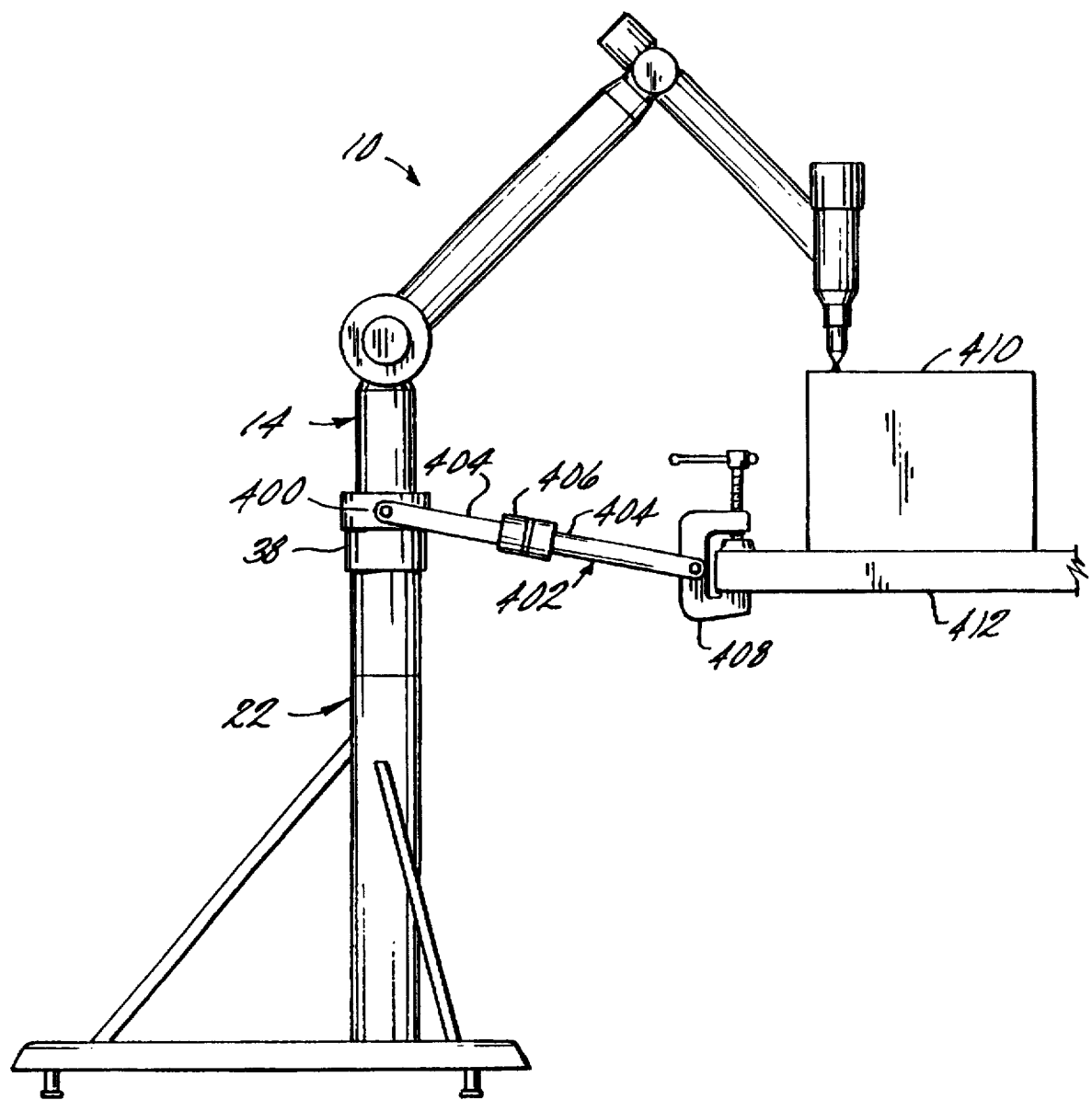
FIG. 22 is a diagrammatic front elevation view of the measuring arm of the present invention depicting strut supports for stability between the measuring arm and the object being measured.

Referring now to FIG. 22, the details of the strut and its use will be described. The base 14 of the measuring arm 10 is mounted into base plate 38 of a theodolite stand 22 or other suitable rigid plate in a known manner. Base plate 38 has threaded holes 400 of a suitable known size extending outwardly in at least two places directly opposite each other. Strut 402 is generally comprised of four elements. There are two arm elements 404, an adjustment screw 406 and a universal clamp 408 (i.e., C-clamps) as shown. Of course, instead of a C-clamp as shown, any number of adaptable attachment devices could be used such as magnetic clamps and suction clamps. As shown in FIG. 22, an item 410 to be measured by the three dimensional measuring arm 10 is mounted to a second mounting plate 412 or is otherwise rigidly fixed. Thus both base plates 38 and 412 are held rigidly in relation to one another and instability is reduced to an absolute minimum.

Figure 23A:
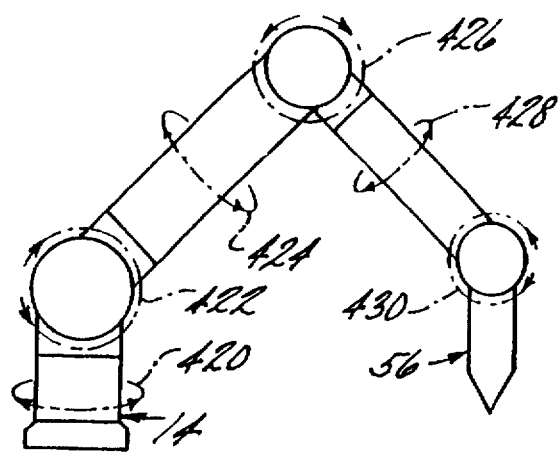
FIG. 23A is a diagrammatic front elevation view of the measuring arm of the present invention representing a preferred embodiment of the six degrees of freedom in a 2-2-2 configuration.
Figure 23B:
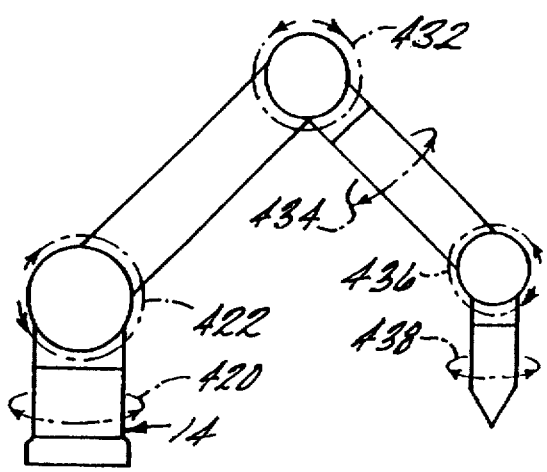
FIG. 23B is a diagrammatic front elevation view of the measuring arm of the present invention representing a second preferred embodiment of the six degrees of freedom in a 2-1-3 configuration.
Figure 23C:
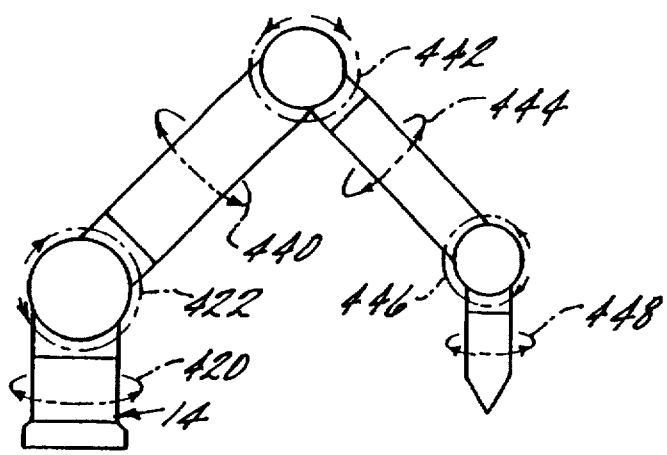
FIG. 23C is a diagrammatic front elevation view of the measuring arm of the present invention representing a third preferred embodiment of the seven degrees of freedom in a 2-2-3 configuration.

Three basic arm configurations in accordance with the present invention of three dimensional coordinate measuring apparatus or CMM's have been developed to meet a wide range of needs and conditions. Two of these arm configurations allow for six degrees of freedom. A third arm configuration allows for seven degrees of freedom. These three arm configurations represent three preferred embodiments of the present invention. Each embodiment has advantages for different functions and/or measuring conditions as dictated by the objects being measured or function or operation being performed. FIGS. 3 and 23A–C describe each of these configurations. Also reference to FIG. 3 should also be made. FIGS. 23A–C are diagrammatic representations of degrees of freedom allowed in CMM 10. The support base 14 allows two degrees of freedom as indicated by the rotational arrows 421 and 422.

CMM 10 may be compared to the arm configuration of the human body as consisting of elements such as a shoulder which would be equivalent to support base 14, the elbow element between extension members 44 and 50 is the equivalent of the elbow of the human arm and the handle/probe assembly 56 is equivalent to the human wrist. The design FIG. 23A which has two degrees of freedom represented at the shoulder, elbow and wrist (designated 2-2-2) is more easily able to probe into difficult to reach areas. On the other hand, the FIG. 23B design which has two degrees of freedom at the shoulder, one degree of freedom at the elbow and three degrees of freedom at the wrist has the following advantages. The three degrees of rotation (2-1-3 design) at the end effector (wrist) allows full orientation and positioning of an object or non-axial probe. Each of the two configurations discussed heretofore (FIGS. 23A and B) have very specific advantages as already described. The third preferred arm configuration (FIG. 23B) has the combined advantages of the two arm configurations discussed above by providing seven degrees of freedom (a 2-2-3 configuration). This third preferred arm configuration provides the combined advantages of reach and positioning of the 2-2-2 design and the full end effector orientation capabilities of the 2-1-3 design.

As previously stated, all three configurations have two degrees of freedom at the shoulder (support base 14) designated by rotational arrows 420 and 422. In FIG. 23A, the two degrees of freedom of the elbow are designated by the rotational arrows 424, 426 and finally the two degrees of freedom at wrist (or effect element) assembly 56 are designated by the rotational arrows 428, 430. In FIG. 23B, the one degree of freedom of the elbow segment is designated by the rotational arrows 432 and the three degrees of freedom at the wrist assembly 56 are designated by the rotational arrows 434, 436, and 438. Lastly, in FIG. 23C, the two degrees of freedom of the elbow segment are designated by the rotational arrows 440 and 444 and the 444, 446 and three degrees of freedom at the wrist assembly 56 are designated by the rotational arrows 448.

Of course, it should be noted that each degree of freedom adds to the cost and/or weight of the CMM. That is one of the reasons for offering the three different configurations in accordance with the present invention to accommodate the various needs of different requirements (measuring or processes) that may be needed without increasing the cost of CMM except as is required.

Figure 24A:
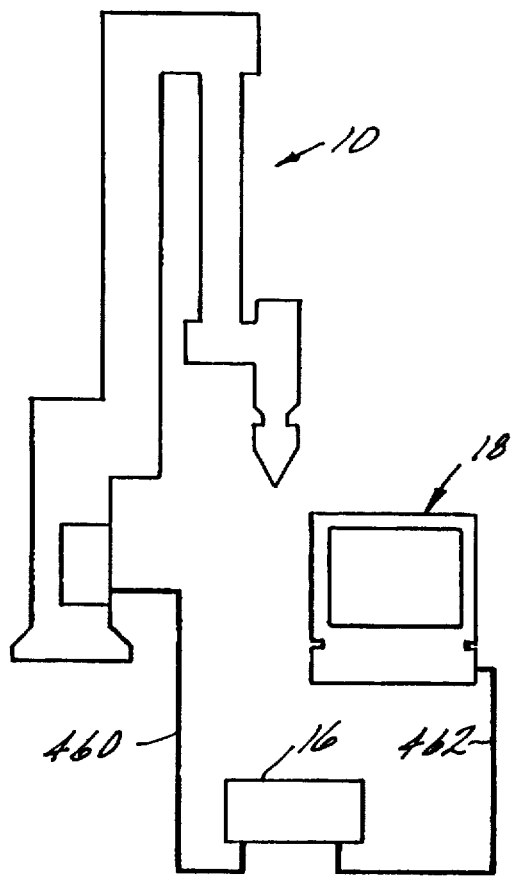
FIG. 24A is a front diagrammatic view of the CMM of FIG. 1 with the CMM, serial box and host computer interconnected with cables.
Figure 24B:
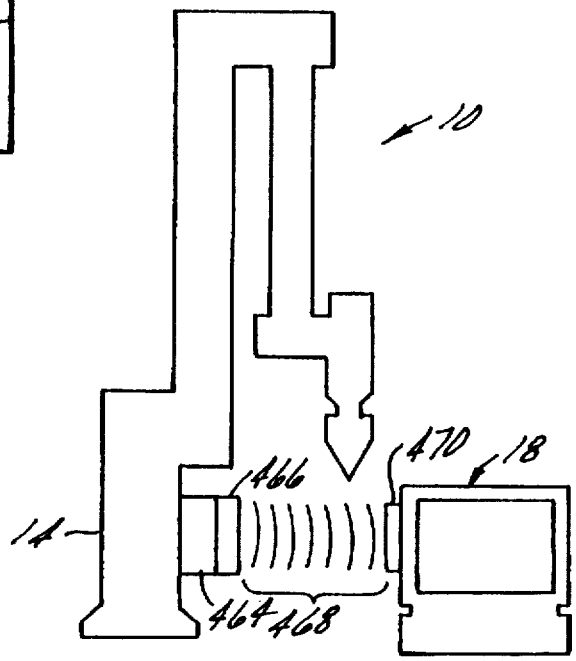
FIG. 24B is a front diagrammatic view of an alternative CMM where the serial box circuitry has been miniaturized and mounted directly to the side (or base) the measuring arm and where both the serial box and host computer can send and receive signals by telemetry.
Figure 25A:
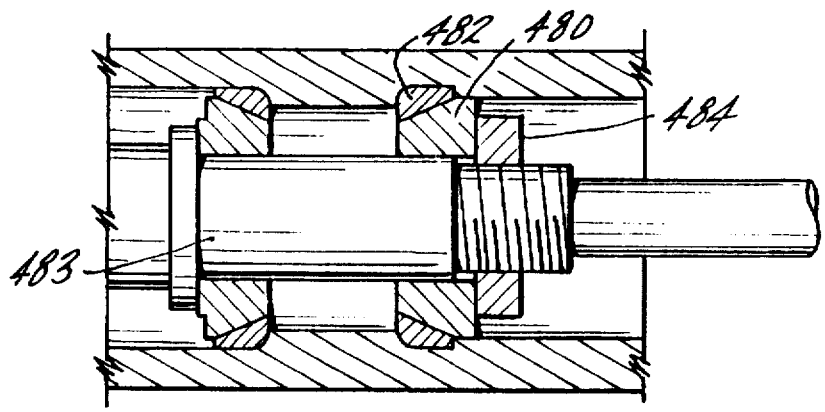
FIGS. 25A and 25B are a cross-sectional elevation views along the center line of a portion of the transfer housing of FIG. 6 depicting a preferred alternative bearing designs of the present invention.
Figure 25B:
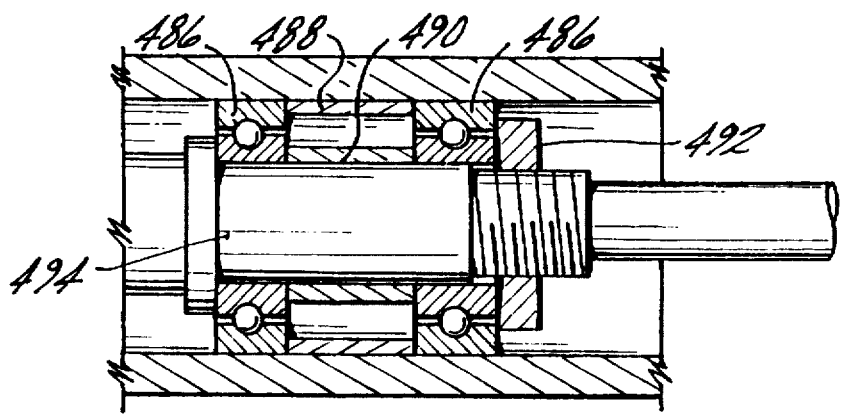

FIGS. 24A and 24B are diagrammatic representations of two preferred means in accordance with the present invention for interconnection of the signal paths between the CMM 10 (coordinate measuring machine), or controller or serial box 16 and the host computer 18. In FIG. 24A (also refer to FIG. 1), CMM 10 is electronically connected to serial box 16 by known cabling means 460 and again serial box 16 is connected by known cabling means 462 to host computer 18. This method of interconnecting the CMM 10, controller or serial box 16 and the host computer 18 is and has proven quite satisfactory for innumerable applications of the present invention. However, there are applications presently known and envisioned in the future where distance or environmental or other conditions would make wireless telemetry the only or preferred method for interconnecting the signals between CMM 10, serial box 16 and host computer 18. This is accomplished in accordance with the present invention by the means shown in FIG. 24B. The circuitry and components are miniaturized and mounted directly on port base 14 of device 10 designated as 464. Miniaturized serial box 464 includes a telemetry device 466 which is provided with means capable of transmitting telemetry signals 468 which are received by a telemetry receiver 470 mounted on host computer 18. Thus, items 10 and 18 are freed of the need to use cabling 460, 462. FIGS. 25A and 25B depict two preferred bearing designs. The bearing design of FIG. 25A has hereinbefore been described in complete detail as depicted in FIGS. 6 and 7. To summarize, a pair of counter positioned layered bearings with inner race 480 and outer race 482 are positioned around a shaft and preloaded using a nut 484. The preloading is determined entirely by the amount of torque applied to the nut 484. This design is quite satisfactory for many applications and has been used with considerable success. However, under certain conditions and applications it is difficult to maintain consistent loading parameters. In these cases, a second preferred alternative embodiment of the bearing design is provided in accordance with the present invention.

This second preferred alternative embodiment of the bearing design is depicted in FIG. 25B. In FIG. 25B, a pair of bearings (usually called duplex bearings) 486 which are usually radial ball bearings and which are preground to permit very specific preloading replace the conical bearings of FIG. 25A. The preloading is preset by the use of fixed spacers 488, 490 and these fixed spacers 498, 490 are tightened down completely by a nut 492. The difference between the duplex bearing casing are accommodated and the amount of preload is predetermined by deformations in the transfer casing at the time of tightening nut 492. An advantageous feature of this second preferred embodiment is that the nut 492 can be tightened as much as possible without any damage of overloading the bearings 486 along the shaft 494.

As hereinbefore discussed, with reference to FIGS. 10A–B, a ball probe 158 and a point probe 160 were described and of course are satisfactory for their intended use in accordance with this invention. Six additional probe embodiments in accordance with the present invention will be discussed in detail by referring to FIGS. 26A–F and FIGS. 9A–B. FIGS. 9A–B are front and rear side elevation views of probe handle assembly 56.

Figure 26I:
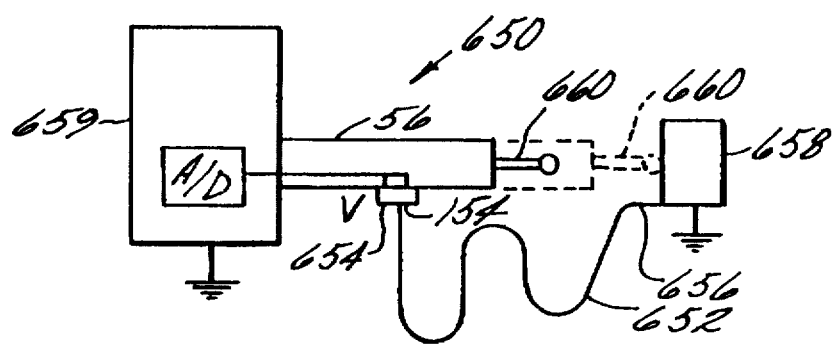
FIG. 26I is a diagrammatic elevation view of a contact probe which makes a measurement upon grounding in accordance with the present invention.
Figure 26C:
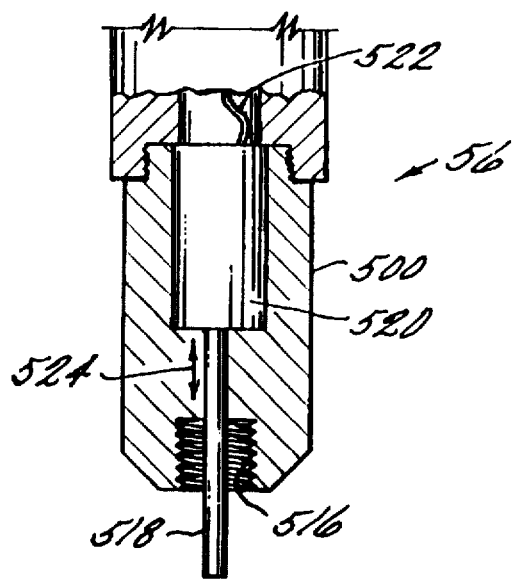
FIG. 26C is a center line cross section elevation view of a transducer probe shaft mount capable of automatic sensing of the machined hole depth of the probes of FIGS. 26A and 26B.
Figure 26A:
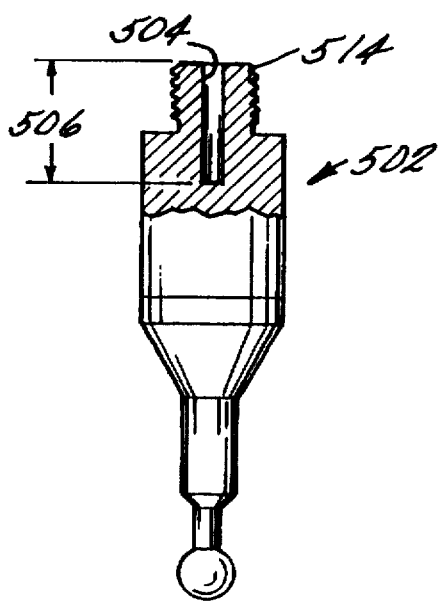
FIG. 26A and 26B are respective side elevation views, partially in cross-section, of two different probes fitted with machined holes of different depth for receiving a probing shaft for automatic identification of the correct probe.
Figure 26B:
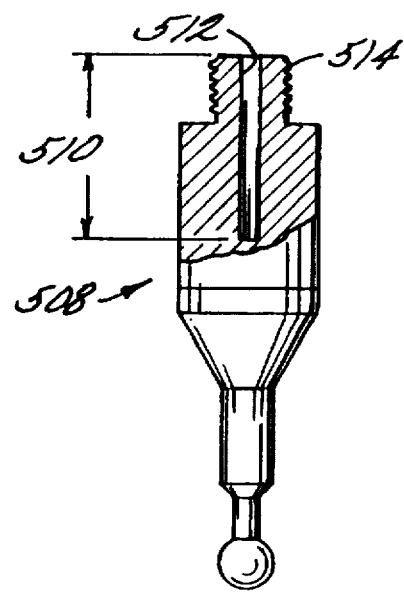

Referring first to FIGS. 26A–C, an adapter 500 is fitted onto the end effector of probe handle assembly 506. Probe 508 which is either of a different size and/or configuration has a relatively longer depth bore 510 and the bore is designated as 572. Both probes 502 and 508 have a male thread 514 sized to match the female thread 516 at the end of adapter 500. Because of the dirty and rigorous environment of the industrial applications in which it is necessary and desirable to use these probes, the use of electrical contacts are often too problematic. To overcome this problem, a probing shaft 518 extends downwardly from a transducer 520 which in turn is connected to the internal circuitry through wiring 522 which connects the probe signal to the rest of the CMM 10 through the probe handle assembly 56. Any number of probes thus can be automatically identified through this invention, thus preventing any errors that would result from manually selecting the wrong probe. In this way, a number of probes can be used that would be difficult to identify with the human eye. Of course, many other applications can be made of this automatic probe identification system. It should be noted that probing shaft 518 is of a slightly smaller diameter than the bores 504, 512. Arrow 524 represents the axial motion of probing shaft 518.

Figures 26D, 26E:
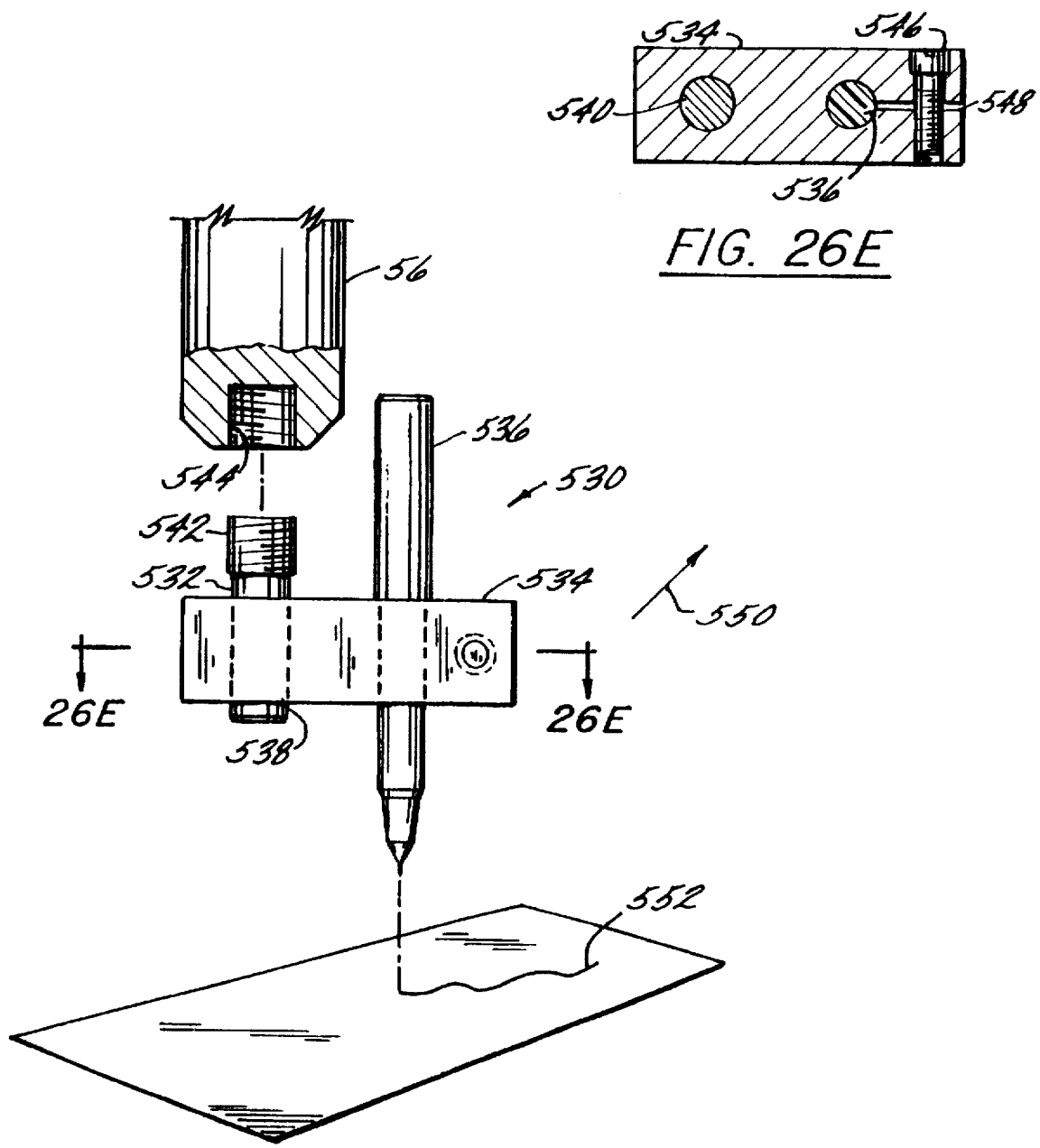
FIG. 26D is a front elevation view of a marking pen probe with the probe mount shown partially in cross-section in accordance with the present invention.
FIG. 26E is a cross sectional view along the line 26E—26E of FIG. 26D.

Turning now to FIGS. 26D and 26E, another embodiment of a probe in accordance with the present invention is generally shown at 530. Marking probe 530 is comprised of mounting system 532, a clamp 534 and a marking pen 536. Mounting stem 532 has a shank 538 which is suitably sized to enter a bore 540 for either a press fit into bore 540, or may be welded or otherwise suitably fastened to clamp 534. The other end of shank 538 of mounting stem 532 has a suitably sized male thread 542 to be threaded into the female bore 544 of the probe handle assembly 56. FIG. 26E is a cross-section of clamps 534 taken along line 26E—26E at the center line of marking pen tightening set screw 546. Note that space 548 allows for secure tightening of marking pen tightening set screw 546. The arrow 550 indicates the direction in which mark 552 is being made. It should be noted that in this manner, the marking probe 530 can be used with a wide variety of marking implements to create highly accurate lines and/or other operations with the benefit of the inherent accuracy of the CMM 10 of this present invention.

Figure 26F:
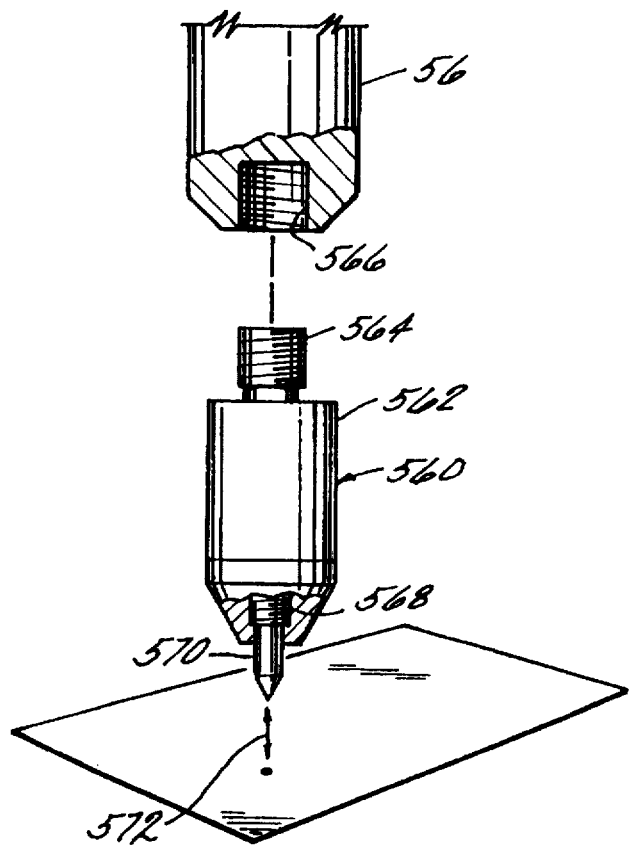
FIG. 26F is a front elevation view, partially in cross section of an automatic punch probe in accordance with the present invention.

A third additional preferred embodiment of a probe in accordance with the present invention is shown in FIG. 26F and is generally shown at 560. Automatic punch probe 560 is comprised of a standard recoil punch probe. The mounting portion 562 of punch probe 560 has a male thread 564 which is sized to be threaded into female thread 566 of probe handle assembly 56. Internally, automatic punch probe 560 contains a recoil spring and trigger assembly 568 which allows the positioning of the punch point 570 along the axial direction as shown by arrows 572. Positioning the automatic punch probe 560 in the desired location and then pushing the punch point 570 in the axial direction 572 toward the probe handle assembly 56 will thus actuate a spring release (which is part of the recoil spring and trigger assembly 568) and penetrate a punch prick point without the use of a hammer and therefore achieve location within the high accuracy limits of CMM 10 equal to or close to those accuracy limits that are possible with the same CMM 10 when used only for measurements.

Figure 26G:
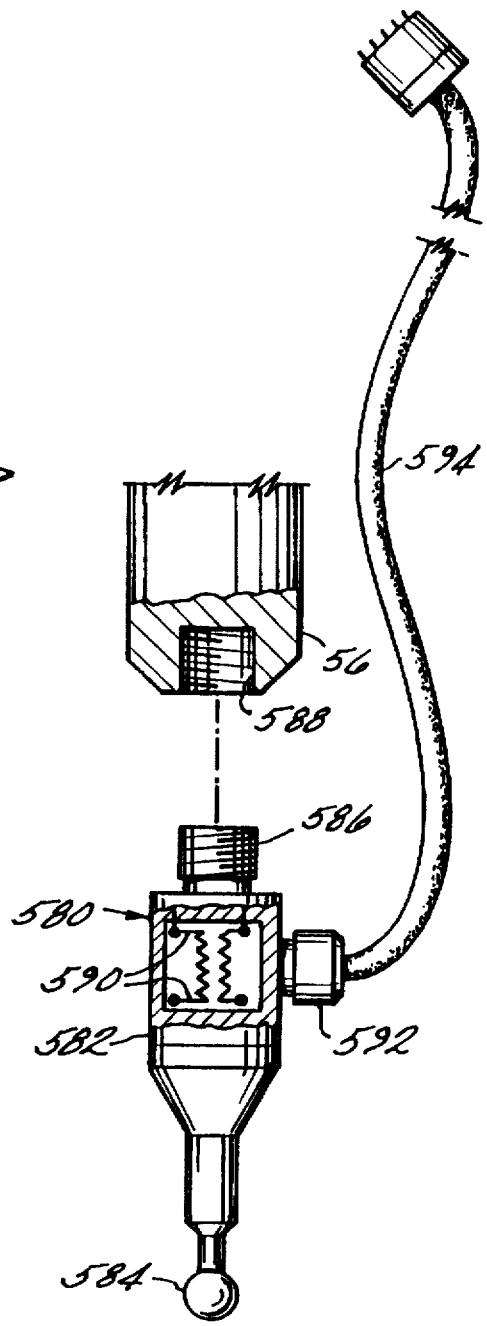
FIG. 26G is a front elevation view, partially in cross section of a force sensing probe in accordance with the present invention.

Turning now to FIG. 26G, a fourth additional preferred embodiment of a probe in accordance with the present invention and known as a force sensing probe will now be described. Basically, this force sensing probe may be equipped with a variety of end tips (ball tip, points tip, flat bottom tips, etc.) which are attached to probe body 582. The force sensing probe is generally shown at 580. A spherical end tip 584 is shown in FIG. 26G. At the top of the force sensing probe 580 is a male mounting thread 586 which is sized to threadably attach to female thread 588 of probe handle assembly 56. The force sensitive probe 580 has internally mounted strain gauges 590 preferably of the readily available and known standard resistive type (such as those manufactured by Omega Engineering, Inc. of Stamford, Conn.), and is connected to the circuitry through connector 592, cable 594 and finally to a suitable connector 596 to connect to the option port 154 of probe handle 56. When the end tip 584 comes in contact with a surface to be measured, the associated forces that develop deform the probe body 582 causing electrical changes in the strain gauges 590, which in turn, automatically trigger the signals through the cabling 594 which thence, is fed through the option port 154 of probe handle assembly 56 and then through the circuitry of CMM 10 through the serial box 16 and the host computer 18. It should be noted that strain gauge technology is well-established and known in the art. While there is a variety of other methodologies for measuring strain, experience in the art has demonstrated that the methodology discussed herein is the preferred methodology.

Figure 26H:
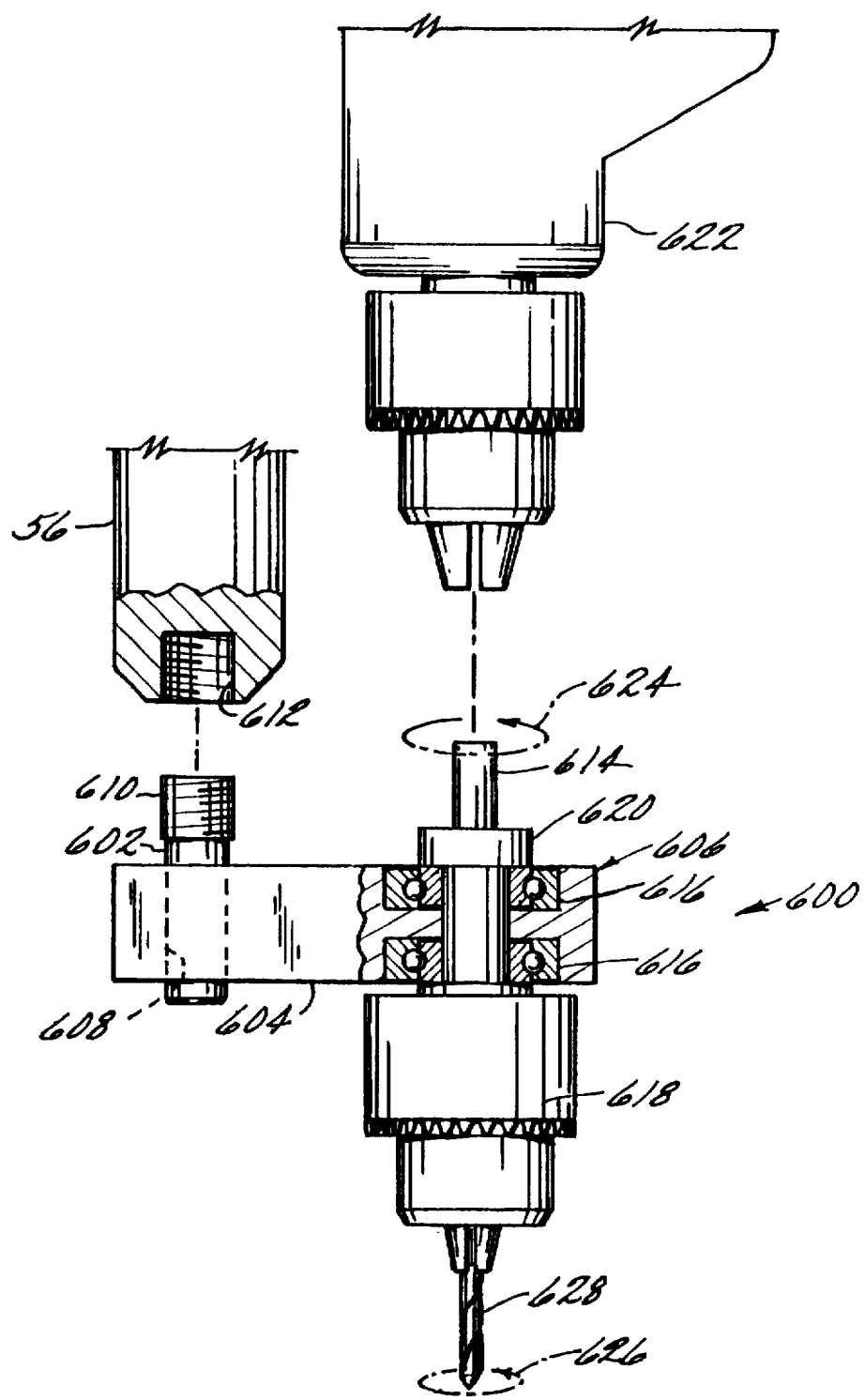
FIG. 26H is a front elevation view, partially in cross section of a drill mounting probe in accordance with the present invention.

FIG. 26H depicts a fifth additional preferred embodiment of a probe in accordance with the present invention, this probe being known as a drill mounting probe. The drill mounting probe is generally shown at 600. Drill mounting probe 600 is compromised of mounting stem 602, body 604 and rotary assembly and shaft 606 laterally displaced from mounting stem 602. Mounting stem 602 is sized at one end to be installed via press fitting into base 608.

Of course, any known method such as welding may be used to install mounting stem 602 into body 604. Mounting stem 602 has a male thread 610 at its upper end sized to fit the female mounting thread 612 of probe handle assembly 56. Rotary assembly 606 is comprised of a shaft 614, an assembly nut 620, a pair of bearings 616 and chuck 618. Shaft 614 is sized at one end to be received by the chuck of a standard drill or other rotary portable power source 622 known to the industry. Body 604 is substantially of rectangular shape and is sized to adequately support the rotary power source described above and is preferably made of aluminum. Assembly nut 620, shaft 614, the pair of bearings 616 and chuck 618 can be assembled in any number of known ways. The bearings 616 are preferably of the ball bearing type. Chuck 618 is sized to handle any desired size drill bit or other tool (i.e., countersink, etc.). The rotary direction of the drill is the same as the direction of the power source 622 as shown by rotary arrow 624 shown between power source 622 and rotary assembly 606 and rotary arrow 626 shown below drill bit 628. The resulting holes or other operations again, with the use of the discussed probe, are within the high accuracy limits of CMM 10.

A sixth additional preferred embodiment of a probe in accordance with the present invention is known as a contact probe and is depicted schematically in FIG. 26I and generally shown at 650. A cable 652 is connected at one end through a connector 654 to the option port 154 of the probe handle assembly 56. The other end of cable 652 is terminated in an alligator clip or other suitable termination 656 to make contact with the metallic object 658 to be measured or other desired functions to be performed. A voltage is applied to cable 652. Grounding occurs as a result of contact by the end probe 660 (shown in solid lines when retracted and dotted lines when extended) contact with the object 658. As a result of this contact with object 658 the voltage V drops to the potential of ground and the software in the analog to digital converter (A to D) 659 has been designated to consider the grounding of cable 652 through the A to D device to be identical to the actuation of the buttons 150, 152 of the probe handle assembly 56. This option port 154 is connected through the cable 652 and the termination 656 to the object 658 which is metallic or conductive. In this manner, the probe 660 is grounded when probe 660 comes into contact with the conductive object 658. Grounding the cable 652 and reducing the voltage V to ground level results in a grounding signal being sent through the A to D device and software to actuate the probe handle assembly 56. Therefore, any time the end probe 660 contacts the object 658, the result is equivalent to a probe handle assembly 56 switch actuation. This is an ideal set up for scanning metallic objects and eliminates the tiring need to constantly activate the switch on the probe handle assembly 56. A further advantageous feature of this contact probe 650 of the present invention is that because the contact switch actuation occurs at the first instance of the probe tip 660 touching the object 658, any additional or subsequent movement involving the object 658 are obviated or precluded and the initial measurements are therefore clear of any extraneous impulses.

Referring back again to FIG. 7 and the heretofore detailed discussions concerning the ability to rotate the various transfer casings of the arm where there is provided an incomplete spherical groove 128 and an end stop screw 130 which protects the elements of the arm by limiting the full rotation and individual set of transfer casings to a maximum of 330°. This arrangement is completely satisfactory for a multiplicity of uses for the CMM 10. However, as will now be discussed, a second preferred embodiment of the present invention allows for 660° of rotation instead of just 330° of rotation of each transfer casing set.

This novel mechanism includes the creation of two incomplete circular grooves in the two halves of the transfer case in which is placed an arc shaped shuttle which is free to transfer through the respective two grooves aforementioned and provide a hard stop at the incomplete groove ends after a full 660° of rotation. Referring now to FIGS. 27A–27E, a transfer case set is shown schematically at 700. FIG. 28A is a top view of the arch shaped shuttle and FIG. 28B is a side elevation view of the arc shaped shuttle used in this second preferred design that allows a full 660° of rotation in any set of transfer cases of the present invention. Matching channels are machined to a suitable depth in the shoulder of the transfer case shaft and the mating shoulder of the transfer case housing sized to accommodate the shuttle 702 (see FIGS. 28A and 28B). In one example, shuttle 702 is preferably 0.246" in height and the inside radius is preferably 1.042 and the outside radius is preferably 1.187" with the length of shuttle 702 representing a 20° arc at these radii shuttle 702 is made preferably of plastic material. X arc represents the 30° stop arc in transfer case housing shoulder and Y represents the 30° stop arc in the transfer case shaft shoulder. Groove 504 in the transfer case housing is sized to accommodate one half of the elevation height of shuttle 702 and suitably finished so that the shuttle 702 freely travels in the groove 704 of the transfer casing housing (see FIG. 27B) and the groove 706 of the transfer case shaft (see FIG. 27C). Shuttle 702 is depicted by cross-hatching in FIGS. 27B–27E. As can be seen in FIGS. 27B and 27C, shuttle groove is free to travel from the P position adjacent to the X stop segment in FIG. 27B (representing the shuttle groove in the transfer case shoulder housing) and the P position adjacent to the Y stop segment in FIG. 27C (representing the shuttle groove in the transfer case shaft shoulder) 330° to the P1 position adjacent to the X stop segment in FIG. 27B and the P1 position adjacent to the Y stop segment in FIG. 27C. As seen in FIG. 27D, shuttle 702 is now rigidly fixed between segment Y and segment X as seen in FIG. 27D after counter clockwise rotation of 330°. In FIG. 27E, the transfer case assembly is thus allowed to rotate an additional 330° in a clockwise direction. It should be noted that the shuttle 702 is designed to have a shear strength to protect the elements of the CMM 10 from deformation should the arm be moved beyond the 660° provided by this invention as a safety precaution. Not shown is a window slot provided for easy replacement of the shuttle 702.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing, said transfer housing including a housing shoulder and a shaft shoulder for housing a position transducer, said transducer producing a position signal;

a support base attached to said first end of said movable arm;

a probe attached to said second end of said movable arm;

an electronic circuit for receiving said position signals from said transducer and providing a digital coordinate corresponding to the position and orientation of said probe in a selected volume;

a groove in both the transfer housing shoulder and the transfer shaft shoulder to allow a preselected rotation of each transfer housing; and a shear shuttle for preventing mechanical overload due to mechanical stressing of said transfer housing.

2. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing, said transfer housing including a housing shoulder and a shaft shoulder for housing a position transducer, said transducer producing a position signal;

a support base attached to said first end of said movable arm;

a probe attached to said second end of said movable arm;

an electronic circuit for receiving said position signals from said transducer and providing a digital coordinate corresponding to the position and orientation of said probe in a selected volume;

a groove in the transfer housing shoulder to allow a preselected rotation of each transfer housing; and an endstop in said transfer housing shaft positioned in said groove for preventing mechanical overload due to mechanical stressing of said transfer housing.

3. The measuring system of claim 2 wherein said preselected rotation is 330°.

4. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing for housing a position transducer, at least one of said rotational transfer housings including a pair of counterpositioned layered bearings, said transducer producing a position signal;

a support base attached to said first end of said movable arm;

a probe attached to said second end of said movable arm; and an electronic circuit for receiving said position signals from said transducer and providing a digital coordinate corresponding to the position and orientation of said probe in a selected volume.

5. The measuring system of claim 4 wherein at least one adjustable strut is provided to provide rigidity and stability between the said support base and an object to be measured.

6. The measuring system of claim 4 wherein means are provided in the probe assembly to insure that an end effector is automatically identified by the CMM.

7. The measuring system of claim 6 wherein means are provided to attach to the end effector a marking probe.

8. The measuring system of claim 7 wherein said means are threaded means.

9. The measuring system of claim 7 wherein said marking probe comprises a mounting system and a marking pen.

10. The measuring system of claim 7 wherein said mounting system includes a mounting stem having a shank matable with a bore in said movable arm on a first end of said stem and a threaded arrangement on a second end of said stem for mating with said probe.

11. The measuring system of claim 6 wherein means are provided to attach to the end effector a force sensitive transducer probe.

12. The measuring system of claim 6 wherein means are provided to attach to the end effector a drill probe.

13. The measuring system of claim 12 wherein means are provided to attach an external power source to the drill probe.

14. The measuring system of claim 6 wherein means are provided to attach to the end effector a continuity probe.

15. The measuring system of claim 4 including seven degrees of freedom.

16. The measuring system of claim 4 wherein the signals are transmitted by telemetry which are received by the host computer via a telemetry signal.

17. The measuring system of claim 4 wherein said support base further includes a strut extending therefrom to a support member for an item to be measured, said strut providing increased stability between the moveable arm and the item to be measured.

18. The measuring system of claim 17 wherein said strut comprises at least two segments attached axially by at least one adjustable member, said strut having a pivoting attachment at each of a first and second end of said strut said first end being pivotally attached to said support base and said second end being pivotally attached to said support member for the item to be measured.

19. The measuring system of claim 18 wherein said at least one adjustable member is in threaded connection with said at least two segments.

20. The measuring system of claim 18 wherein said second end pivotal attachment to said support member includes a clamp to grip said support member and said clamp is pivotally secured to said second end.

21. The measuring system of claim 20 wherein said clamp is a c-clamp.

22. The measuring system of claim 4 wherein the system includes a serial box and a host computer which are sequentially operably connected to said moveable arm.

23. The measuring system of claim 22 wherein said moveable arm, serial box and computer are interconnected via a telemetry signal transmitting device and a telemetry signal receiver.

24. The measuring system of claim 4 wherein said probe is a force sensing probe.

25. The measuring system of claim 24 wherein said probe is a force sensing probe including an end tip selected from the group consisting of spherical, flat bottom, ball and point.

26. The measuring system of claim 25 wherein said force sensing probe comprises at least one internally mounted strain gauge which is operably connected to the measuring system circuity.

27. The measuring system of claim 4 wherein said probe is a contact probe.

28. The measuring system of claim 27 wherein said contact probe provides an automatic switch.

29. A three dimensional coordinate measuring system comprising:

a movable arm having opposed first and second ends, said arm including a plurality of joints with each joint corresponding to a degree of freedom such that said arm possesses seven degrees of freedom and is movable within a selected volume, each of said joints comprising a transducer, said transducer producing a position signal;

a support base attached to said first end of said movable arm;

a probe attached to said second end of said movable arm; and an electronic circuit for receiving said position signals from said transducer and providing a coordinate corresponding to the position and orientation of said probe in a selected volume.

30. The measuring system of claim 29 wherein at least one adjustable strut is provided to provide rigidity and stability between the said support base and an object to be measured.

31. The measuring system of claim 29 wherein means are provided in the probe assembly to insure that an end effector is automatically identified by the CMM.

32. The measuring system of claim 31 wherein means are provided to attach to the end effector a marking probe.

33. The measuring system of claim 32 wherein said means are threaded means.

34. The measuring system of claim 32 wherein said marking probe comprises a mounting system and a marking pen.

35. The measuring system of claim 34 wherein said mounting system includes a mounting stem having a shank matable with a bore in said movable arm on a first end of said stem and a threaded arrangement on a second end of said stem for mating with said probe.

36. The measuring system of claim 31 wherein means are provided to attach to the end effector a force sensitive transducer probe.

37. The measuring system of claim 31 wherein means are provided to attach to the end effector a drill probe.

38. The probe of claim 37 wherein means are provided to attach an external power source to the drill probe.

39. The measuring system of claim 31 wherein means are provided to attach to the end effector a continuity probe.

40. The measuring system of claim 29 including seven degrees of freedom.

41. The measuring system of claim 29 wherein the signals are transmitted by telemetry which are received by the host computer via a telemetry signal.

42. The measuring system of claim 29 wherein said support base further includes a strut extending therefrom to a support member for an item to be measured, said strut providing increased stability between the moveable arm and the item to be measured.

43. The measuring system of claim 42 wherein said strut comprises at least two segments attached axially by at least one adjustable member, said strut having a pivoting attachment at each of a first and second end of said strut said first end being pivotally attached to said support base and said second end being pivotally attached to said support member for the item to be measured.

44. The measuring system of claim 43 wherein said at least one adjustable member is in threaded connection with said at least two segments.

45. The measuring system of claim 43 wherein said second end pivotal attachment to said support member includes a clamp to grip said support member and said clamp is pivotally secured to said second end.

46. The measuring system of claim 45 wherein said clamp is a c-clamp.

47. The measuring system of claim 29 wherein the system includes a serial box and a host computer which are sequentially operably connected to said moveable arm.

48. The measuring system of claim 47 wherein said moveable arm, serial box and computer are interconnected via a telemetry signal transmitting device and a telemetry signal receiver.

49. The measuring system of claim 29 wherein said probe is a force sensing probe.

50. The measuring system of claim 49 wherein said probe is a force sensing probe including an end tip selected from the group consisting of spherical, flat bottom, ball and point.

51. The measuring system of claim 49 wherein said force sensing probe comprises at least one internally mounted strain gauge which is operably connected to the measuring system circuity.

52. The measuring system of claim 29 wherein said probe is a contact probe.

53. The measuring system of claim 52 wherein said contact probe provides an automatic switch.

54. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing, said transfer housing including a housing shoulder and a shaft shoulder for housing a position transducer, said transducer producing a position signal;

a probe attached to said second end of said movable arm;

an electronic circuit for receiving said position signals from said transducer and providing a coordinate corresponding to the position of said probe in a selected volume;

a groove in both said transfer housing shoulder and said transfer shaft shoulder to allow a preselected rotation of each transfer housing; and a shuttle positioned in the groove in said transfer housing shoulder and in the groove in said transfer shaft shoulder.

55. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing, said transfer housing including a housing shoulder and a shaft shoulder for housing a position transducer, said transducer producing a position signal;

a probe attached to said second end of said movable arm;

an electronic circuit for receiving said position signals from said transducer and providing a coordinate corresponding to the position of said probe in a selected volume;

a groove in said transfer housing shoulder to allow a preselected rotation of each transfer housing; and an endstop in said transfer housing shaft positioned in said groove.

56. A three dimensional coordinate measuring system comprising:

a movable arm having opposed first and second ends, said arm including a plurality of joints with each joint corresponding to a degree of freedom such that said arm is movable within a selected volume, each of said joints comprising a rotational transfer housing for housing a position transducer, at least one of said rotational transfer housings including a pair of counterpositioned layered bearings, said transducer producing a position signal;

a probe attached to said second end of said movable arm; and an electronic circuit for receiving said position signals from said transducer and providing a coordinate corresponding to the position of said probe in a selected volume.

57. A three dimensional coordinate measuring system comprising:

a movable arm having opposed first and second ends, said arm including a plurality of joints with each joint corresponding to a degree of freedom such that said arm possesses seven degrees of freedom and is movable within a selected volume, each of said joints comprising a transducer, said transducer producing a position signal;

a probe attached to said second end of said movable arm; and an electronic circuit for receiving said position signals from said transducer and providing a coordinate corresponding to the position of said probe in a selected volume.

* * * * *

UNITED STATES PATENT AND TRADEMARK OFFICE
CERTIFICATE OF CORRECTION

PATENT NO. : 5,794,356
DATED : *Aug. 18, 1998
INVENTOR(S) : Simon Raab

It is certified that error appears in the above-indentified patent and that said Letters Patent is hereby corrected as shown below:

Column 1 line 67 delete "0.0003" insert --0.003--

Column 4 line 21 insert --of-- between "base)" and "the"

Column 5 line 62 delete "an" insert --and--

Column 5 line 66 delete "fifth" insert --sixth--

Column 8 line 14 delete "19" insert --10--

Column 8 line 19 delete "t" insert --to--

Column 8 line 22 delete "158(housing 150,152)" insert --58(housing 58)--

Column 11 line 59 delete "92" insert --192--

Column 13 line 59 delete "(FIG. 23B)" insert --(FIG. 23C)--

Column 14 line 7 delete "s" between "arrrow" and "432"

Column 14 line 11 delete "444 and the 444, 446 and" insert --442 and the -- between "and" and "three"

Column 14 line 13 insert --444,446 and-- between "arrows" and "448"

Column 14 line 45 insert new paragraph between "460,662."and "FIGS. 25A"

UNITED STATES PATENT AND TRADEMARK OFFICE
CERTIFICATE OF CORRECTION

PATENT NO. : 5,794,356
DATED : *Aug. 18, 1998
INVENTOR(S) : Simon Raab

It is certified that error appears in the above-identified patent and that said Letters Patent is hereby corrected as shown below:

Column 14 line 65 delete "498" insert --488--
Column 15 line 16 delete "506" insert --56--
Column 15 line 19 delete "572" insert --512--
Column 16 line 42 delete "compromised" insert --comprised--

Signed and Sealed this

Thirtieth Day of May, 2000

Attest:

Q. TODD DICKINSON

Attesting Officer    Director of Patents and Trademarks

UNITED STATES PATENT AND TRADEMARK OFFICE
CERTIFICATE OF CORRECTION

PATENT NO.     : 5,794,356  
DATED          : August 18, 1998  
INVENTOR(S)    : Simon Raab Page 1 of 1

It is certified that error appears in the above-identified patent and that said Letters Patent is hereby corrected as shown below:

<u>Title page,</u>
Item [63], Related U.S. Application Data, after "Pat. No. 5,611,147" insert -- , which is a continuation-in-part of Serial No. 21,949, Feb. 23, 1993, Pat. No. 5,402,582 --

<u>Column 1,</u>
Line 7, after "Pat. No. 5,611,147" insert -- , which is a continuation-in-part of Serial No. 21,949, Feb. 23, 1993, now U.S. Pat. No. 5,794,356 --

Signed and Sealed this

Twenty-fourth Day of December, 2002

JAMES E. ROGAN
*Director of the United States Patent and Trademark Office*